(12) United States Patent
Schuitema et al.

(10) Patent No.: US 8,260,574 B1
(45) Date of Patent: Sep. 4, 2012

(54) DIAGNOSTIC DEVICE FOR MATERIAL HANDLING SYSTEM AND METHOD OF DIAGNOSING

(75) Inventors: Dennis J. Schuitema, Ada, MI (US); Kenneth J. Kooistra, Byron Center, MI (US); Stephen C. Wolf, Grand Rapids, MI (US); Matthew A. Steenwyk, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 800 days.

(21) Appl. No.: 12/341,561

(22) Filed: Dec. 22, 2008

Related U.S. Application Data

(60) Provisional application No. 61/016,159, filed on Dec. 21, 2007.

(51) Int. Cl.
*G06F 11/00* (2006.01)

(52) U.S. Cl. ............... 702/183; 198/571; 73/118.01; 73/865.9; 73/866.4

(58) Field of Classification Search ........... 702/183; 73/118.01, 865.9, 866.4; 198/571
See application file for complete search history.

(56) References Cited

U.S. PATENT DOCUMENTS

| | | | |
|---|---|---|---|
| 3,571,705 A | 3/1971 | Crane et al. | |
| 3,688,557 A | 9/1972 | Marinus | |
| 3,718,040 A | 2/1973 | Freeman et al. | |
| 3,924,461 A | 12/1975 | Stover | |
| 3,974,689 A | 8/1976 | McNeil | |
| 4,005,601 A | 2/1977 | Botello | |
| 4,417,466 A | 11/1983 | Panetti | |
| 4,535,699 A | 8/1985 | Buhler | |
| 4,566,339 A | 1/1986 | Davidson et al. | |
| 4,803,886 A | 2/1989 | May et al. | |
| 4,908,767 A | 3/1990 | Scholl et al. | |
| 6,170,726 B1 * | 1/2001 | Jensen | 225/12 |
| 6,563,408 B1 * | 5/2003 | Miller | 335/128 |
| 6,681,160 B2 | 1/2004 | Bidaud | |
| 6,805,233 B2 * | 10/2004 | Verhaeghe | 198/750.6 |
| 6,814,216 B2 | 11/2004 | Veit et al. | |
| 6,865,955 B2 | 3/2005 | Nassar et al. | |
| 6,866,136 B2 * | 3/2005 | Veit et al. | 198/370.02 |
| 7,081,824 B2 | 7/2006 | Gilbert | |
| 7,164,975 B2 | 1/2007 | Bidaud | |
| 7,254,896 B2 | 8/2007 | Carr et al. | |
| 7,325,669 B2 * | 2/2008 | Frost et al. | 198/502.3 |
| 7,337,682 B2 | 3/2008 | Otto et al. | |
| 7,353,937 B2 * | 4/2008 | Ziegler | 198/810.03 |
| 7,370,751 B2 | 5/2008 | Smith et al. | |
| 7,584,646 B2 * | 9/2009 | Schleif et al. | 73/9 |
| 2004/0154413 A1 * | 8/2004 | Coy et al. | 73/862.453 |
| 2007/0069041 A1 * | 3/2007 | Quinones et al. | 239/71 |
| 2007/0203621 A1 | 8/2007 | Haugen et al. | |
| 2008/0264765 A1 | 10/2008 | Smith et al. | |

* cited by examiner

*Primary Examiner* — Michael Nghiem
*Assistant Examiner* — Alexander Satanovsky
(74) *Attorney, Agent, or Firm* — Gardner, Linn, Burkhart & Flory, LLP

(57) ABSTRACT

A technique is provided for diagnosing deficiencies in a material handling system having a track and a material support member adapted to travel on the track. A diagnostic device travels with the material support member and includes one or more sensors that measure one or more parameters of the material support member. Such parameters may include an amount of force exerted laterally against one or more restraining members or the accelerations of the material support member. The material handling system may include a plurality of slats connected in an endless web that defines a conveying surface upon which articles are transported.

11 Claims, 20 Drawing Sheets

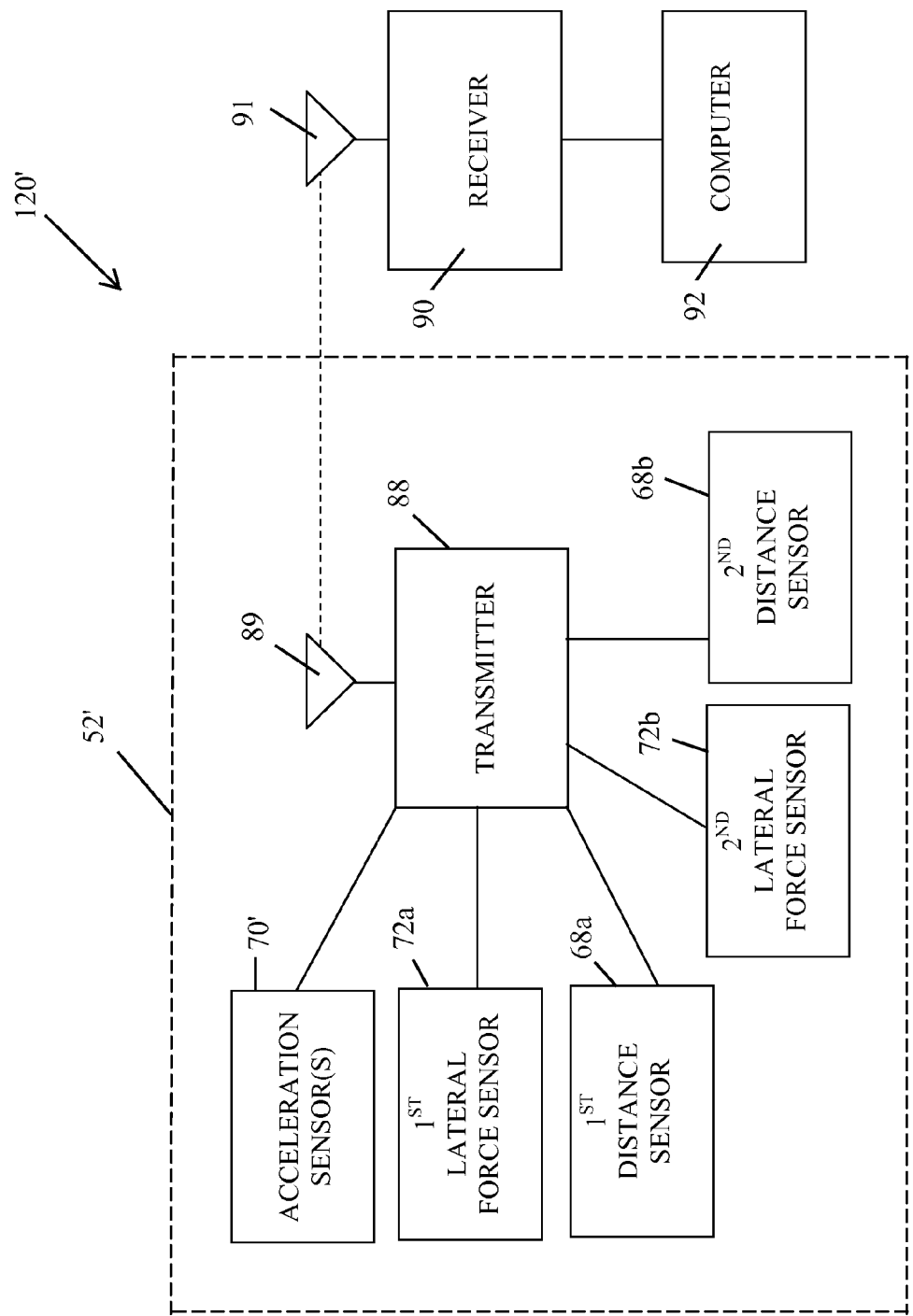

DIAGNOSTIC DEVICE FOR MATERIAL HANDLING SYSTEM AND METHOD OF DIAGNOSING

CROSS-REFERENCE TO RELATED APPLICATIONS

This application claims priority to commonly assigned U.S. provisional patent application Ser. No. 61/016,159 filed Dec. 21, 2007 by Schuitema et al. and entitled DIAGNOSTIC DEVICE FOR MATERIAL HANDLING SYSTEM AND METHOD OF DIAGNOSING, the complete disclosure of which is hereby incorporated herein by reference.

BACKGROUND OF THE INVENTION

The present invention pertains to a material handling system and, in particular, to a technique for evaluating the material handling system, including, but not limited to, determining defects in the material handling system. The invention can be applied to positive displacement shoe and slat sorters, automated storage and retrieval systems, cross-belt sorters, tilt tray sorters, and the like.

Material handling systems tend to be very large systems. In the case of positive displacement shoe and slat sorters, by way of example, the conveying surface can extend for hundreds of feet. If the material handling system goes out of specification, it may be difficult to determine with precision where the condition exists. This is particularly troublesome if there are numerous deviations from specification. While any one of these may not significantly degrade operation of the material handling system, their cumulative affect can be very detrimental.

Such out of specification condition can occur at different times during the life of the material handling system. It can occur while the material handling system is being installed. It can also occur after the system has been in operation for many years. This can be the result of wear of the components, from debris accumulating in the system or it can be the result of the surface on which the system is mounted being subject to movement, just to name a few. The latter situation may result from the mounting of the material handling system on an overhead platform which is quite common; as such platforms are prone to movement over the lifetime of the material handling system.

The use of tools for measuring and monitoring the distance between moving objects and support tracks or rails of material handling systems is known. For example, U.S. Pat. No. 7,081,824 issued to Gillespie discloses a system adapted to detect the linear displacement of a wheel set of a railroad bogie relative to the tracks on which the bogie rides. The use of measurement devices for measuring the distance between traveling slat members and lateral tracks in positive linear displacement conveyor sortation systems has also been described. The use of distance sensors for measuring distance to a rail or restraining surface, however, provides only limited information regarding the condition of a material handling system.

SUMMARY OF THE INVENTION

The present invention provides a unique diagnostic device and method of diagnosing deficiencies in a material handling system that takes much of the guesswork out of the diagnosis and that provides more useful information than prior systems. It also is capable of providing a diagnosis with minimal downtime to the material handling system.

According to a first aspect of the invention, a method of evaluating a conveying system adapted to transport articles is provided. The method includes installing a diagnostic device on the conveying system that includes a force sensor; activating the conveying system such that the diagnostic device travels along the path of the conveying system; and measuring an amount of force exerted by a component of the conveying system against a stationary surface wherein the force is oriented in a direction substantially perpendicular to a direction of conveyance.

According to another aspect of the invention, a method of evaluating a conveying system adapted to transport articles is provided. The method includes installing a diagnostic device on the conveying system that includes a sensor; activating the conveying system such that the diagnostic device travels at least once around an endless loop; measuring a characteristic of the conveying system at a first time with the sensor as the diagnostic device travels around the loop; recording the characteristic as measured during the first time; measuring the characteristic of the conveying system at a second time with the sensor as the diagnostic device travels around the loop; and comparing the characteristic as measuring during the second time with the characteristic as measured during the first time.

According to another aspect of the invention, a diagnostic device for evaluating a conveying system adapted to transport articles over an endless web of slats in a direction of conveyance is provided. The diagnostic device includes a body having first and second ends, first and second force sensors, a reference object detector, and a transmitter. The first and second force sensors are positioned at the first and second ends of the body, respectively, and are adapted to detect forces exerted by the diagnostic device against first and second stationary surfaces, respectively, wherein the forces are oriented in a direction substantially parallel to a longitudinal axis of the body that extends from the first end to the second end. The reference object sensor is attached to the body and detects a reference object positioned at a known location along the endless loop of the conveying system. The transmitter is also attached to the body and wirelessly transmits data to a remote receiver wherein the data relates to the forces and position of the reference object.

According to another aspect of the invention, a material handling system is provided that includes a track, a material support member, and a diagnostic device that travels with said material support member. The track includes a vertical restraining surface that is adapted to at least occasionally restrain lateral movement of the material handling support member. The diagnostic device includes a lateral force sensor that measures a force of engagement of the material handling support member against the restraining surface. The diagnostic device is further adapted to determine a drag on the support member contacting the restraining surface as a function of the force measured by the lateral force sensor.

According to other aspects, the methods and systems may involve removing a selected component from the conveying system and mounting a modified component containing the diagnostic device to said conveying system in a location that was at least partially previously occupied by the removed component. The amount of force measured may be wirelessly transmitted to a remote receiver that may correlate the force to a position of the diagnostic device as it travels around an endless loop. A second force sensor may be mounted to the material support component to measure a force of engagement against a second restraining surface at an opposite end of the material support member. The reference object may be one or more magnets positioned alongside the conveying system at known locations.

A measurement of the amount of lateral force may be made for one complete trip around the endless loop, recorded, and then used as a baseline comparison for future measurements of the amount of lateral force. One or more accelerometers may also be positioned on the material support member for measuring acceleration in one or more directions. The material support member may be a slat having a longitudinal body that is oriented generally horizontally and part of an endless web of slats that define a conveying surface upon which articles are transported by the conveying system.

BRIEF DESCRIPTION OF THE DRAWINGS

FIG. 17B is an electrical block diagram of a second embodiment of a diagnostic system;

DESCRIPTION OF THE PREFERRED EMBODIMENT

Figure 1:
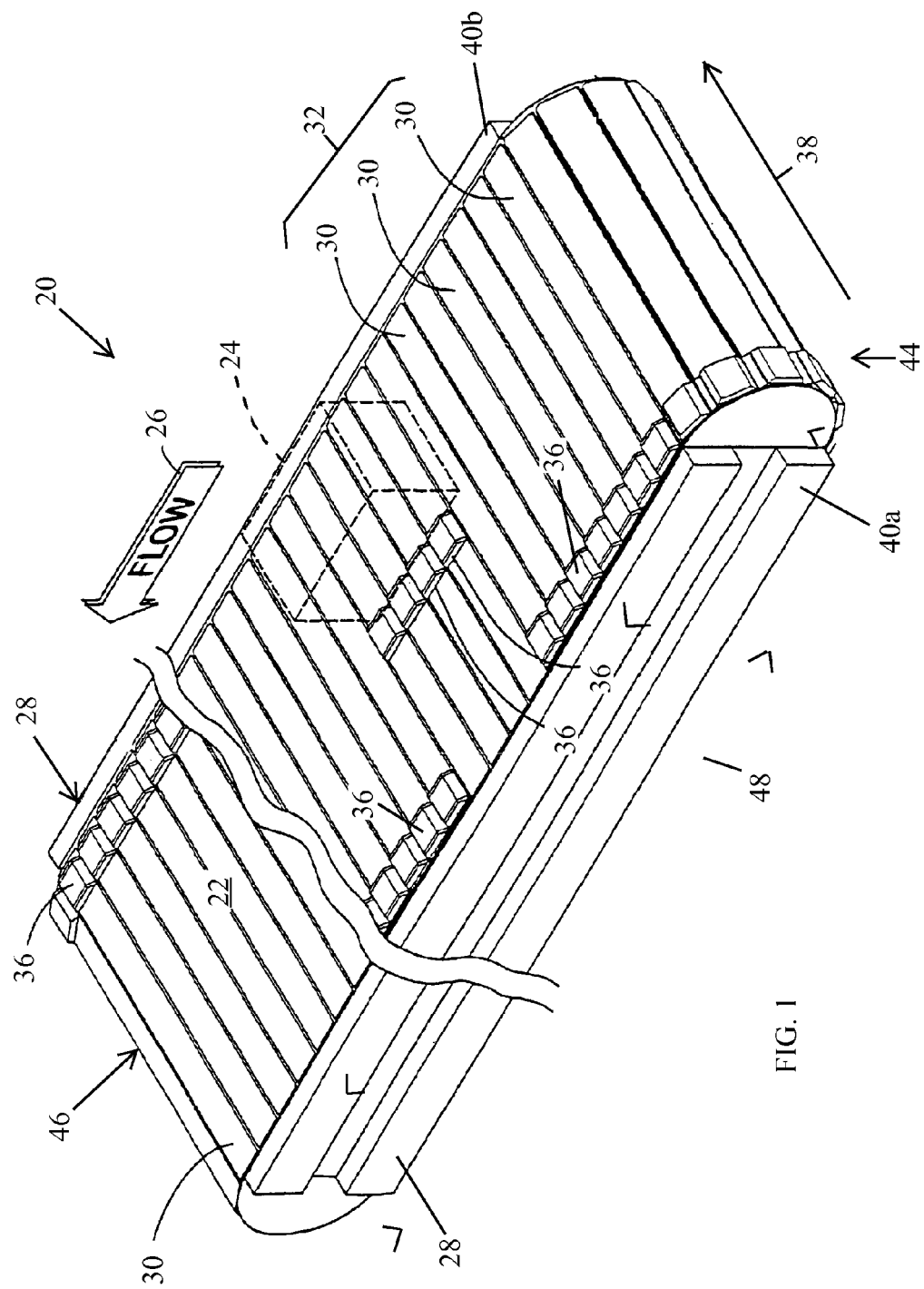
FIG. 1 is a perspective view of a material handling system according to one embodiment.

Referring now to the drawings and the illustrative embodiments depicted therein, a material handling system 20 includes a conveying surface 22 adapted to transport a plurality of articles 24 in a direction of conveyance 26. In the embodiment shown in FIG. 1, conveying system 20 is a positive displacement sorter, although it will be understood that other types of conveying systems may be used in accordance with the present teachings, such as, but not limited to, tilt-tray sorters, carousel-type sorters, automated storage and retrieval systems, and other types of material handling systems.

Material handling system 20 includes a frame 28 that is adapted to support a plurality of material support members or slats 30. Slats 30 are connected together to form an endless web 32 that defines conveying surface 22 on which articles 24 travel. A pusher shoe 36 is mounted around each slat 30 and is adapted to travel in a lateral direction 38 from a first side 40 to a second side 42 of frame 28, and vice versa. The lateral movement of pusher shoes 36 allows articles 24 traveling on conveying surface 22 to be pushed off to one of sides 40 or 42 and onto an adjacent takeaway conveyor or other structure (not shown) for further transportation to the article's final destination within a warehouse or other type of material handling facility. By selectively activating the shoes 36 at the appropriate times, the articles 24 may be diverted onto the correct one of the plurality of takeaway conveyors. Material handling system 20 thus functions as a sortation conveyor adapted to sort articles to their appropriate destination, and may be part of a larger material handling system that includes the takeaway conveyors, as well as additional conveyors feeding system 20 and other material handling structures.

Material handling system 20 includes a charge end 44 and a discharge end 46 opposite charge end 44 (FIG. 1). Charge end 44 receives articles from one or more feed conveyors (not shown). Conveying surface 22 moves the received articles 24 towards discharge end 46 and may deliver them to a recirculation conveyor if the pusher shoes 36 fail to divert the articles 24 onto an adjacent takeaway conveyor or other structure. When slats 30 reach discharge end 46, they are rotated downward to a lowered position where they then travel underneath the slats 30 that define conveying surface 22. In the lowered position, slats 30 travel in a direction opposite to direction of conveyance 26 and return to charge end 44. At charge end 44, the slats are rotated back to their elevated position for further transportation of articles 24 in direction 26. The path of slats 30 thus defines an endless loop 48.

Further details of the construction of an illustrative example of material handling system 20 may be found in commonly assigned U.S. Pat. No. 5,127,510 entitled MODULAR DIVERTER SHOE AND SLAT CONSTRUCTION, the disclosure of which is hereby incorporated herein by reference. However, the various embodiments disclosed herein can be applied to other positive displacement sorters, such as those illustrated in U.S. Pat. No. 6,860,376 B1 and Japanese Utility Model 61-24500 published Jul. 23, 1986, to name but a few of those that are commercially available.

An electric motor (not shown), or other means, powers conveying system 20 and moves slats 30 along endless loop 48. Such motion is transmitted from the motor to the slats 30 by way of a chain 86 positioned on each side 40 and 42 of frame 28. Chain 86 attaches to each of slats 30 in the manner illustrated in FIGS. 5-10. As slats 30 move, they may occasionally bump into restraining structures on either or both of first side 40 and second side 42 of frame 28. Depending upon the amount of force exerted by the slats 30 against such restraining structures, a drag force is exerted against the slats 30 that tends to retard the forward movement of slats 30. This results in the electric motor having to work harder, which causes the motor to consume greater amounts of electrical current. While such contact between the slats 30 and the restraining structures is typically very little when conveying system 20 in initially installed in a facility, the contact may increase over continued use of the conveying system 20 for a variety of different reasons. For example, the physical foundation of the frame 28 may be shifted, shifting the alignment of the slats 30 between the sides of frame 28. Alternatively, the slats 30 may exhibit a skew condition wherein their generally rectangular shape no longer is oriented such that two sides are parallel to sides 40 and 42 of frame 28, but instead are oriented at a small angle thereto. Other reasons are also possible for causing contact between slats 30 and the restraining structure. Still further, in addition to such contact with the restraining structures, there may be other conditions present within the conveying system 20 that cause an increase amount of drag or that otherwise cause an elevated electrical current draw from the motor that powers conveying system 20.

In order to diagnose these and other conditions, as well as to gather more precise information about these and other conditions, one of the slats 30 may be removed and replaced with a modified slat 50 (FIG. 2), or the sensor components of the modified slat 50 may alternatively be attached to an existing slat 30. Modified slat 50 is generally the same as any of the unmodified slats 30 with the exception that modified slat 50 includes sufficient recesses for housing and supporting one or more diagnostic devices 52. In one embodiment, in order to evaluate the condition of a conveying system 20, one of slats 30 is replaced with a modified slat 50 that includes at least one diagnostic device 52 and the conveying system 20 is thereafter activated such that the modified slat travels around endless loop 48 in the same manner that an unmodified slat 30 would travel. During one or more of the circuits around endless loop 48, the diagnostic device 52 gathers information about the conveying system 20 that may be used to detect problems with conveying system 20 and, if necessary, make corrections to those problems. The information collected may include multiple types of different information, as will be discussed in greater detail below.

As is shown more clearly in FIGS. 5-8, frame 28 includes a track 60 located on each side 40 and 42. A pair of wheels 62 ride on tracks 60. More specifically, a first wheel 62a rides on a track 60 located on first side 40 of frame 28 and a second wheel 62b (FIGS. 2-4) rides on a track 60 located on second side 42 of frame 28 (now shown). Each track 60 includes a horizontal surface 64 and a vertical surface 66. Wheels 62 ride on horizontal surfaces 64. Horizontal surfaces 64 and vertical surfaces 66 are present on both the upper and lower runs of each of the tracks 60. That is, while not illustrated in the drawings, wheels 62 also ride along a horizontal surface 64 while they are traveling underneath conveying surface 22 on their return journey from discharge end 46 to charge end 44.

Vertical surfaces 66 act as stationary restraining surfaces or structure that at least occasionally restrain lateral movement of material support members (i.e. slats) 30. In the illustrative embodiment, vertical surface 66 is defined by a series of blocks of a self-lubricating material 94, such as ultra-high molecular weight (UHMW) materials. Although only one restraining vertical surface 66 is shown in the attached drawings, it should be understood that, as noted above, restraining surfaces 66 are provided outside opposite end portions of the endless web 32 in order to restrain excessive lateral movement of endless web 32.

Figure 2:
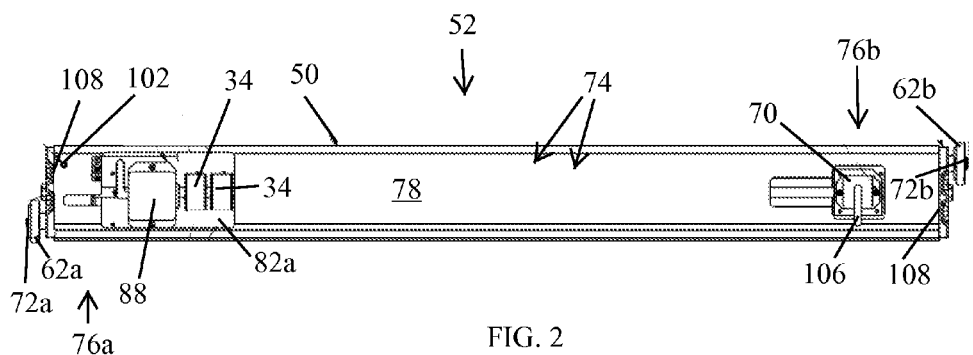
FIG. 2 is a plan view of a diagnostic device and modified slat that may be inserted into the material handling system of FIG. 1.
Figure 3:
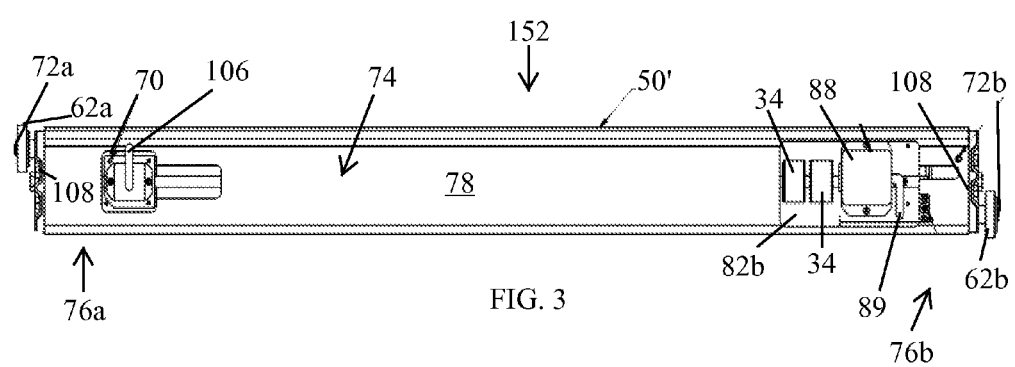
FIG. 3 is a plan view of an alternative diagnostic device and modified slat that may be inserted into the material handling system of FIG. 1.
Figure 4:
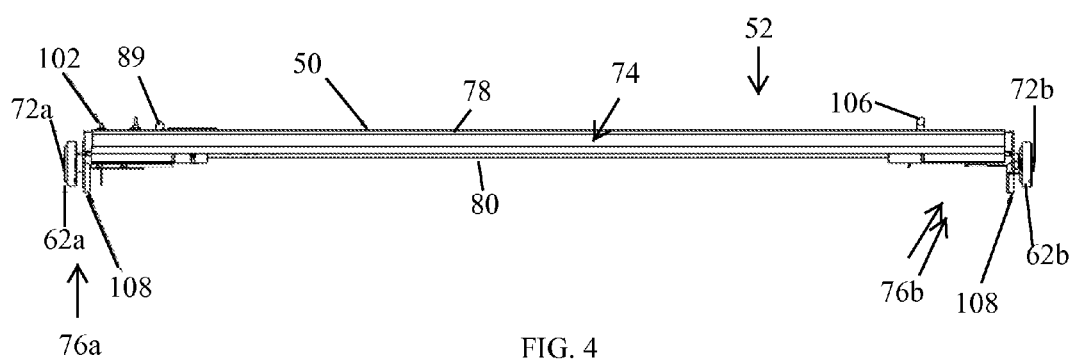
FIG. 4 is a front, elevational view of the slat of FIG. 2.

Diagnostic device 52 travels with modified slat 50, along with a power supply for supplying the necessary power to enable device 52 to carry out its functions. The power supply may include one or more batteries 34. Diagnostic, device 52 further includes a non-contact acceleration sensor 70 that measures acceleration of slat 50 as it travels in its endless loop 48 along tracks 60 (FIGS. 2-4). Acceleration sensor 70 measures the acceleration of slat 50 (or slat 50', as will be discussed in greater detail below), and may be used to determine one or more parameters pertaining to the shape of tracks 60. In particular, the signals produced by acceleration sensor 70 can be mathematically integrated to determine velocity and the velocity information can be mathematically integrated to determine position of the acceleration sensor 70 at various points in time. The mathematics involved is well known to the skilled artisan. By plotting this information, it is possible to chart movement of the acceleration sensor 70. Because the acceleration sensor moves with the slat 50 and the slat 50 travels on tracks 60, it is possible to determine certain dimensional information of the tracks 60 from acceleration sensor 70.

Acceleration sensor 70 may comprise a single sensor that measures acceleration in only a single direction, or it may comprise one or more individual sensors that measure acceleration in more than one dimension. In one embodiment, acceleration sensor 70 includes at least three individual acceleration sensors that measure acceleration in three mutually orthogonal directions, one of which is parallel to the direction of conveyance 26 (FIG. 1) and the other two of which are perpendicular to both conveyance direction 26 and each other. The outputs from all three of these sensors may be integrated, or double integrated, or their readings may be utilized without mathematical integration.

Modified slat 50 includes a body 74 (FIGS. 2-4) that extends in a longitudinal direction from a first side 76a to a second side 76b. Body 74 further includes a top surface 78 and a bottom surface 80 (FIG. 4). Top surface 78 forms part of conveying surface 22 when modified slat 50 is traveling from charge end 44 toward discharge end 46. A first recess 82a is defined in body 74 of slat 50 adjacent first side 76a. A second recess 82b is defined in body 74 of slat 50 adjacent second side 76b. Each recess 82 is shaped to house at several component parts of diagnostic device 52, as will be discussed in greater detail below.

Figure 6:
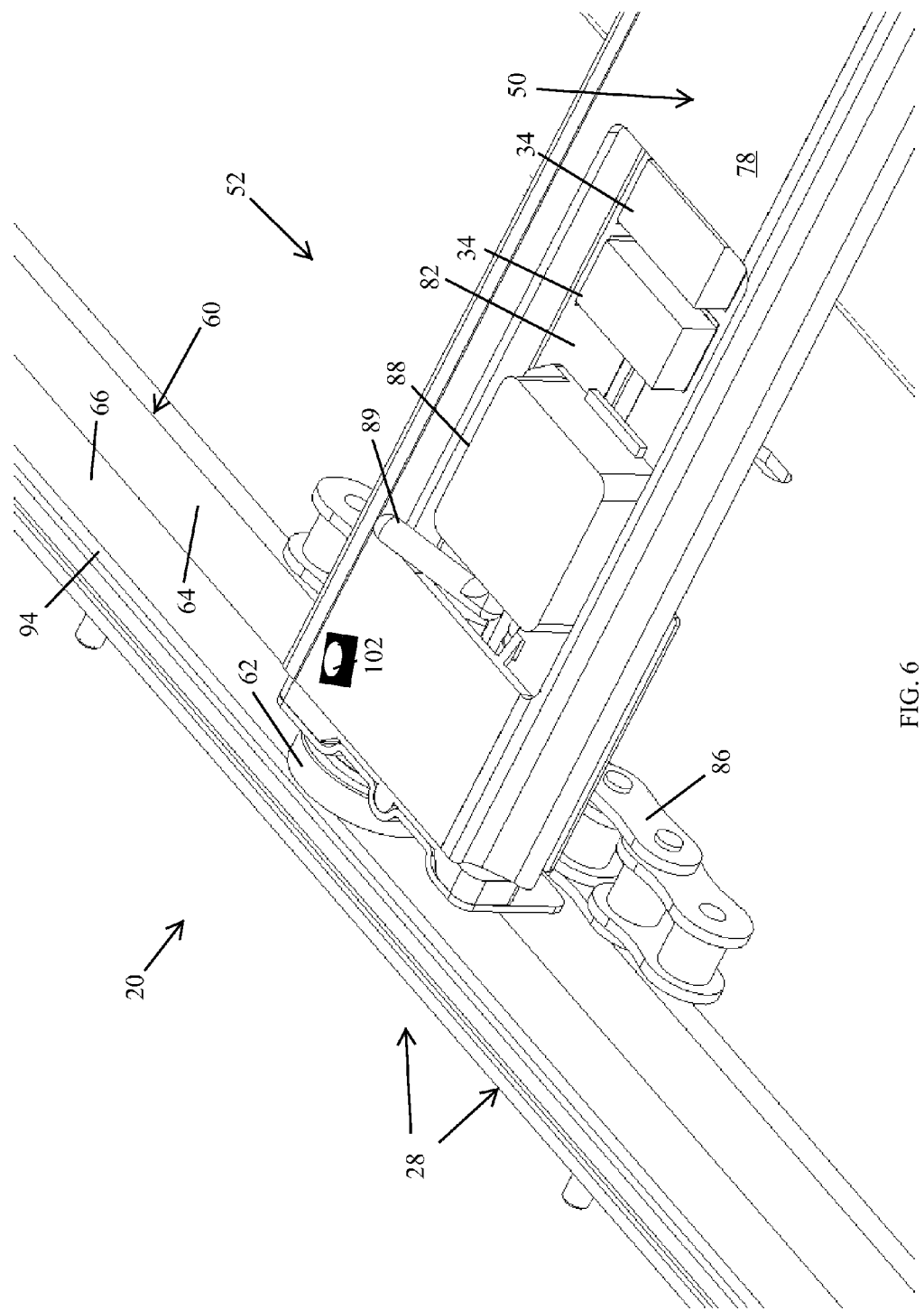
FIG. 6 is a partial perspective view of the frame and slat of FIG. 5 taken from another perspective.
Figure 7:
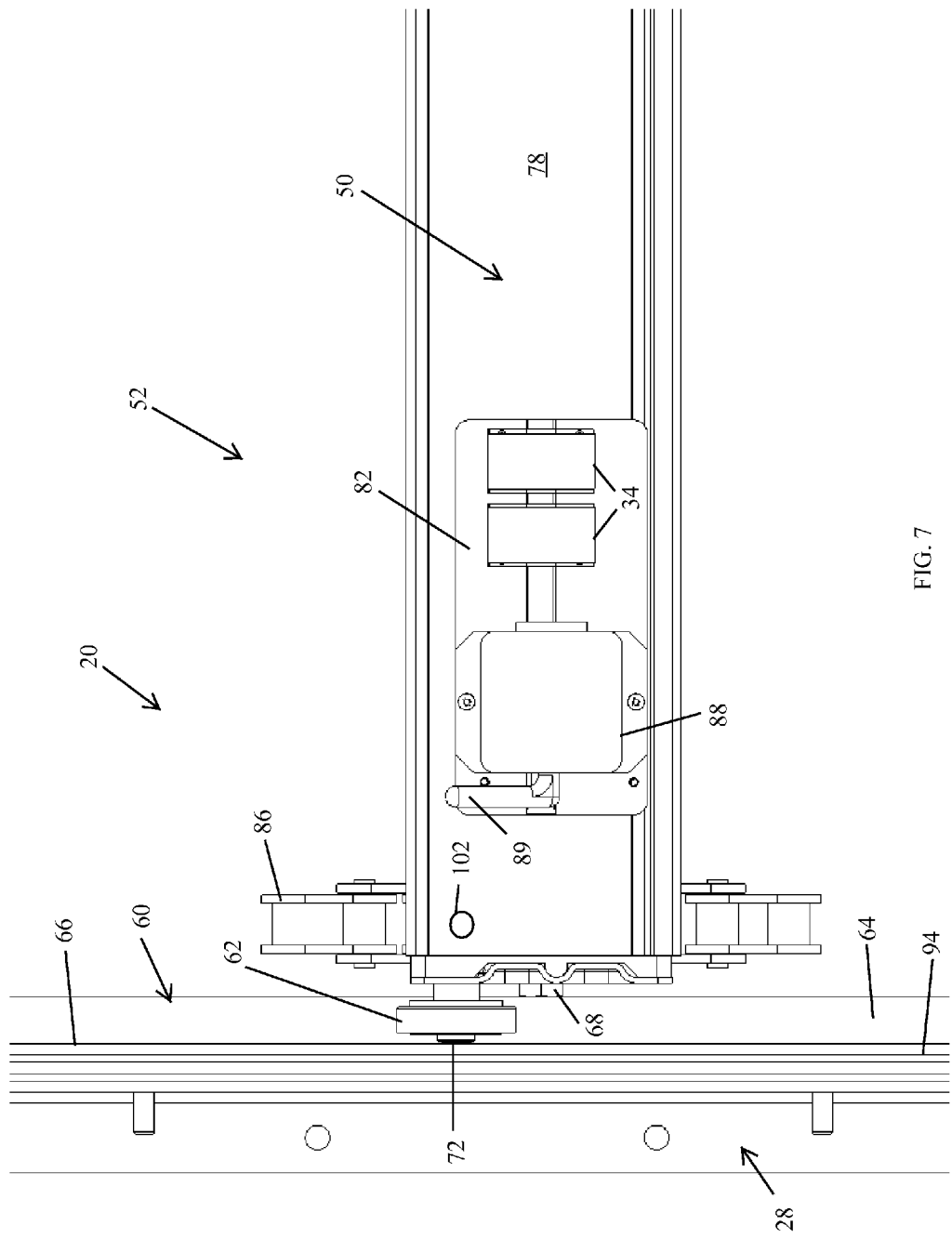
FIG. 7 is a top plan view of the frame and slat of FIG. 5.
Figure 8:
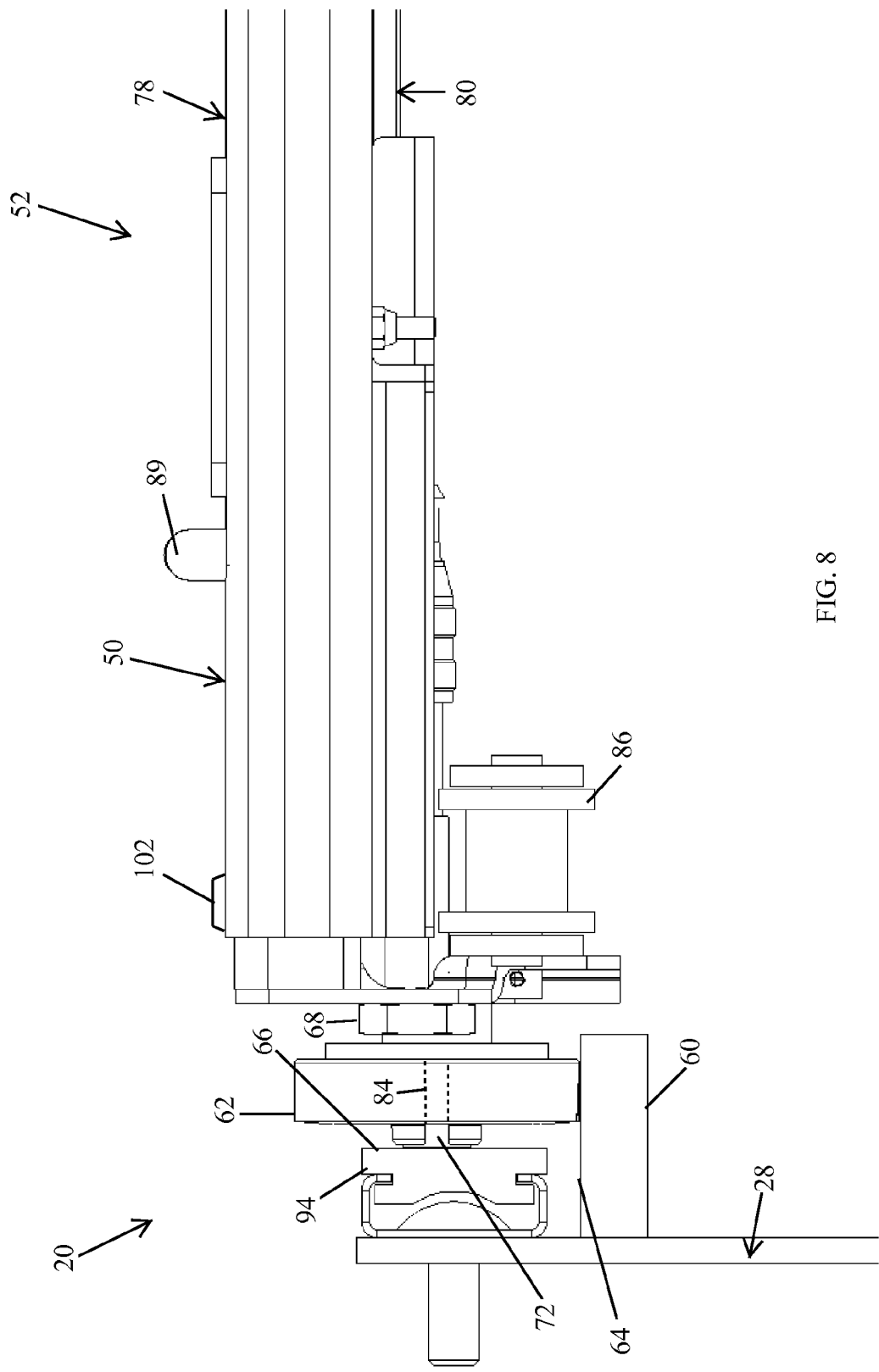
FIG. 8 is a front, elevational view of the frame and slat of FIG. 5.
Figure 9:
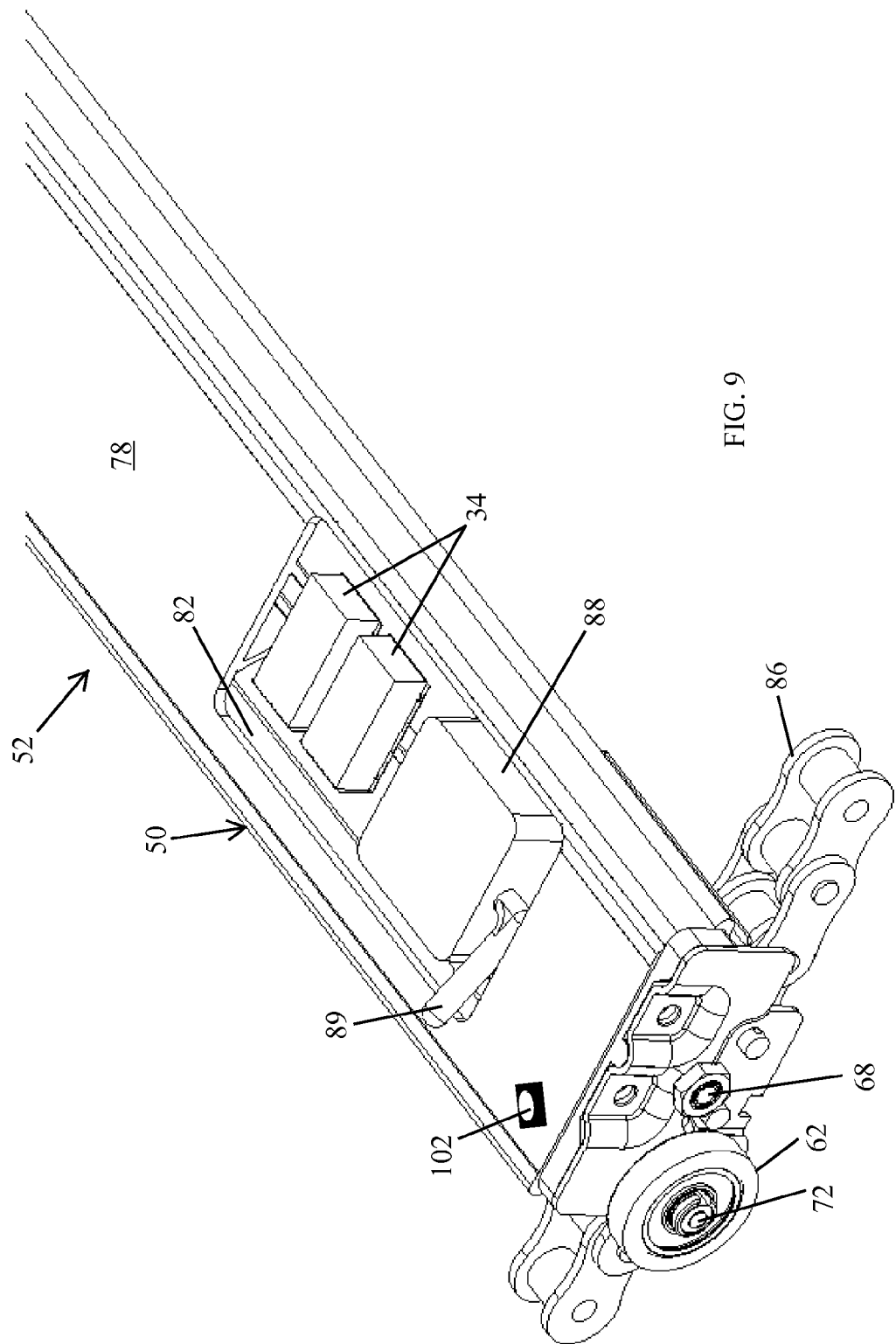
FIG. 9 is a partial, perspective view of the slat and diagnostic device of FIG. 2.
Figure 10:
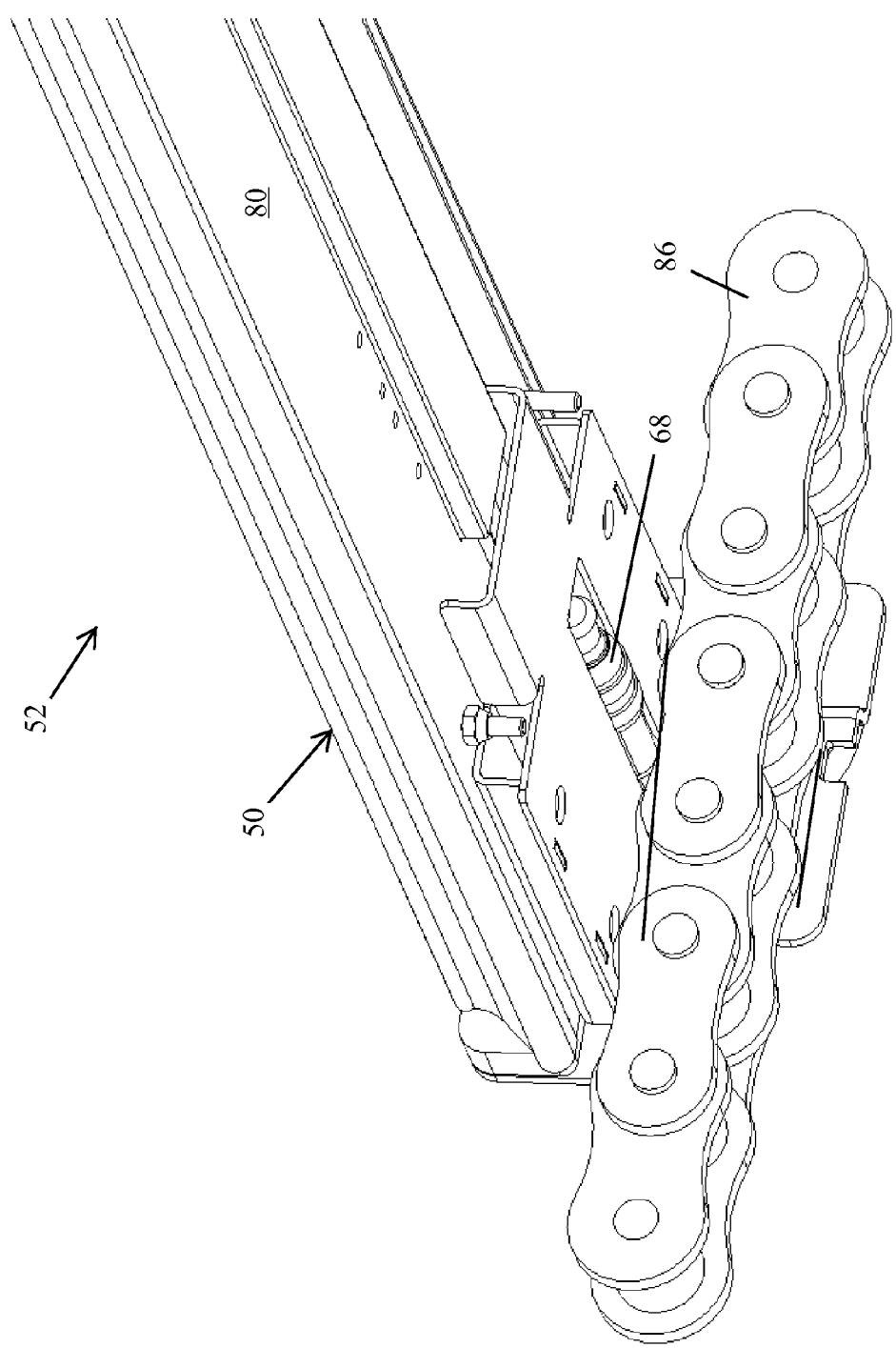
FIG. 10 is a partial, perspective view of the slat of FIG. 2 taken from underneath the slat.
Figure 11:
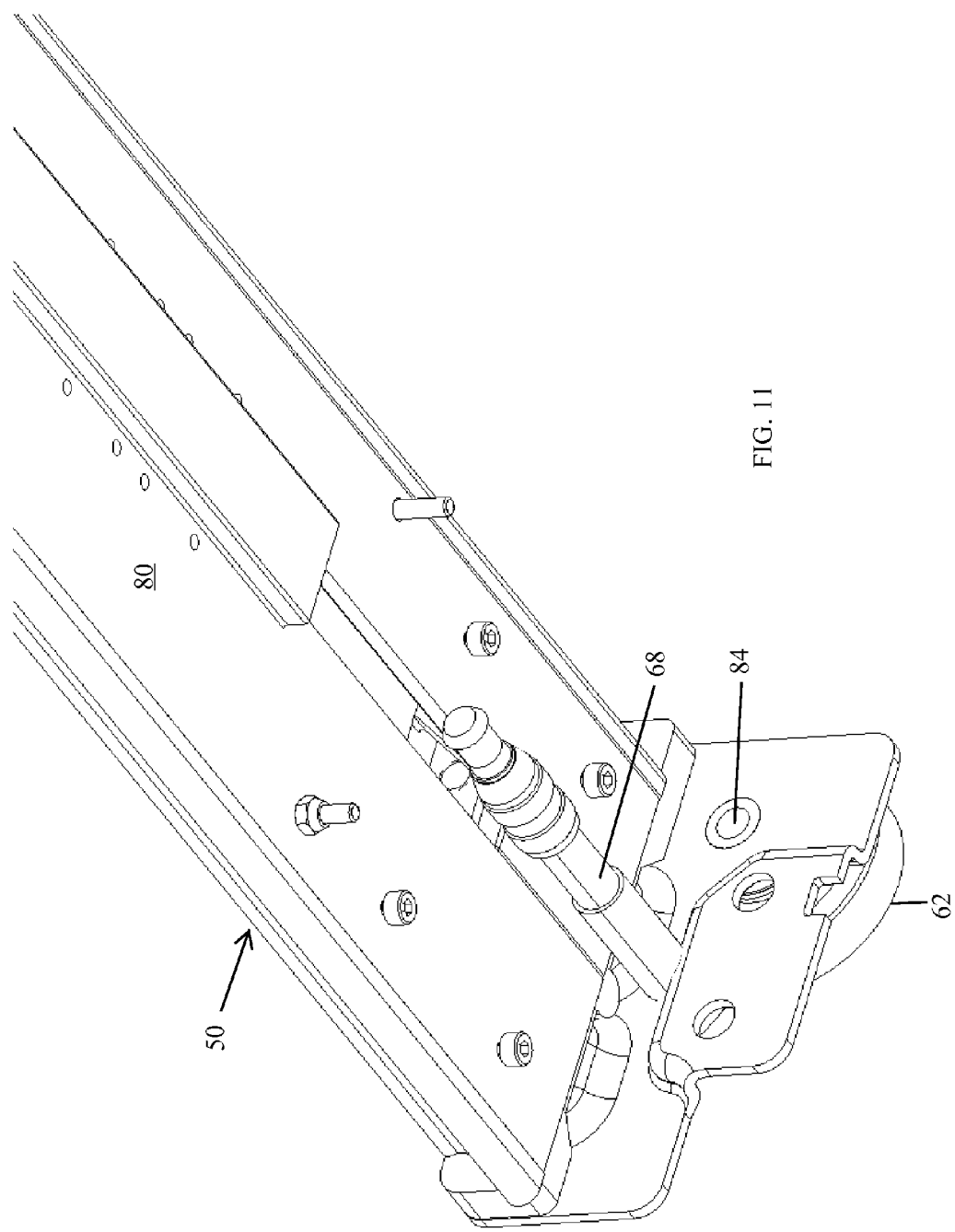
FIG. 11 is the same view as FIG. 10 with several structures removed to illustrate additional detail.
Figure 12:
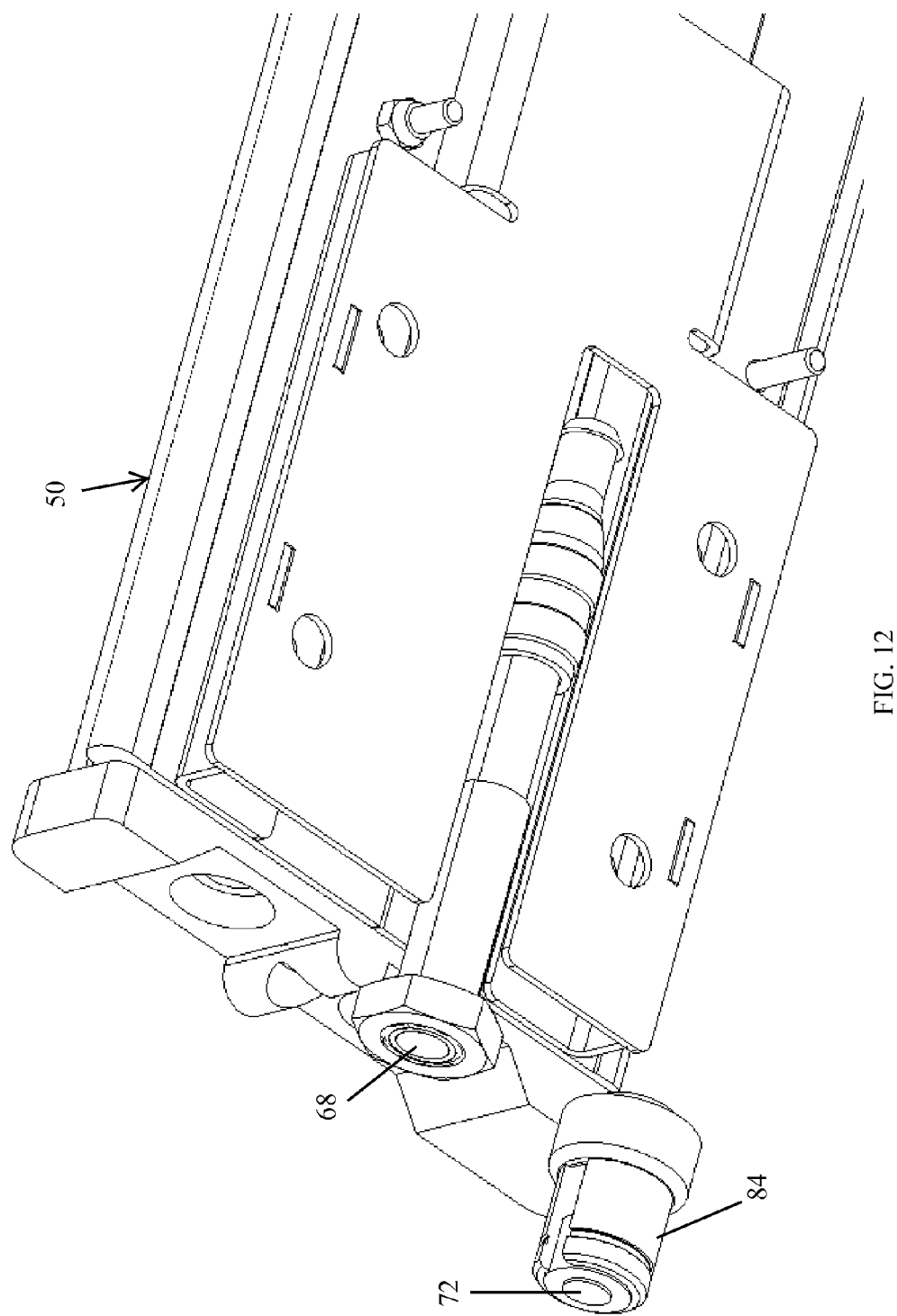
FIG. 12 is a partial, perspective view of an underside of the slat of FIG. 2 shown with a wheel, wheel bracket and chain removed to illustrate additional detail.

In addition to acceleration sensor 70, each diagnostic device 52 may further include another non-contact sensor, such as a lateral force sensor 72. Lateral force sensor 72 senses a force of engagement of the slat 50 against vertical restraining surfaces 66 of track 60 (FIGS. 6-8). That is, it detects a force having a component oriented generally horizontally and perpendicular to the direction of conveyance 26. Stated alternatively, it detects a force that is oriented generally normal to vertical surface 66. The engagement between slat 50 and vertical surface 66 may only be occasional as a gap between slats 30 and vertical restraining surface 66 is normally present. By knowing the coefficient of friction of the material of restraining surface 66, such as UHMW, relative to the material of slat 50 (which is the same as that of slat 30) that occasionally comes into contact with surface 66, such as steel, diagnostic device 52 is able to determine a drag on endless web 32 when contacting restraining surface 66 as a function of the force measured by lateral force sensor 72. In the illustrated embodiments, lateral force sensor 72 is mounted in an opening in an axle 84 (FIG. 8) that rotatably supports wheel 62. This allows the sensing surface of the force sensor 72 to protrude slightly beyond the lateral extent of endless web 32.

Figure 5:
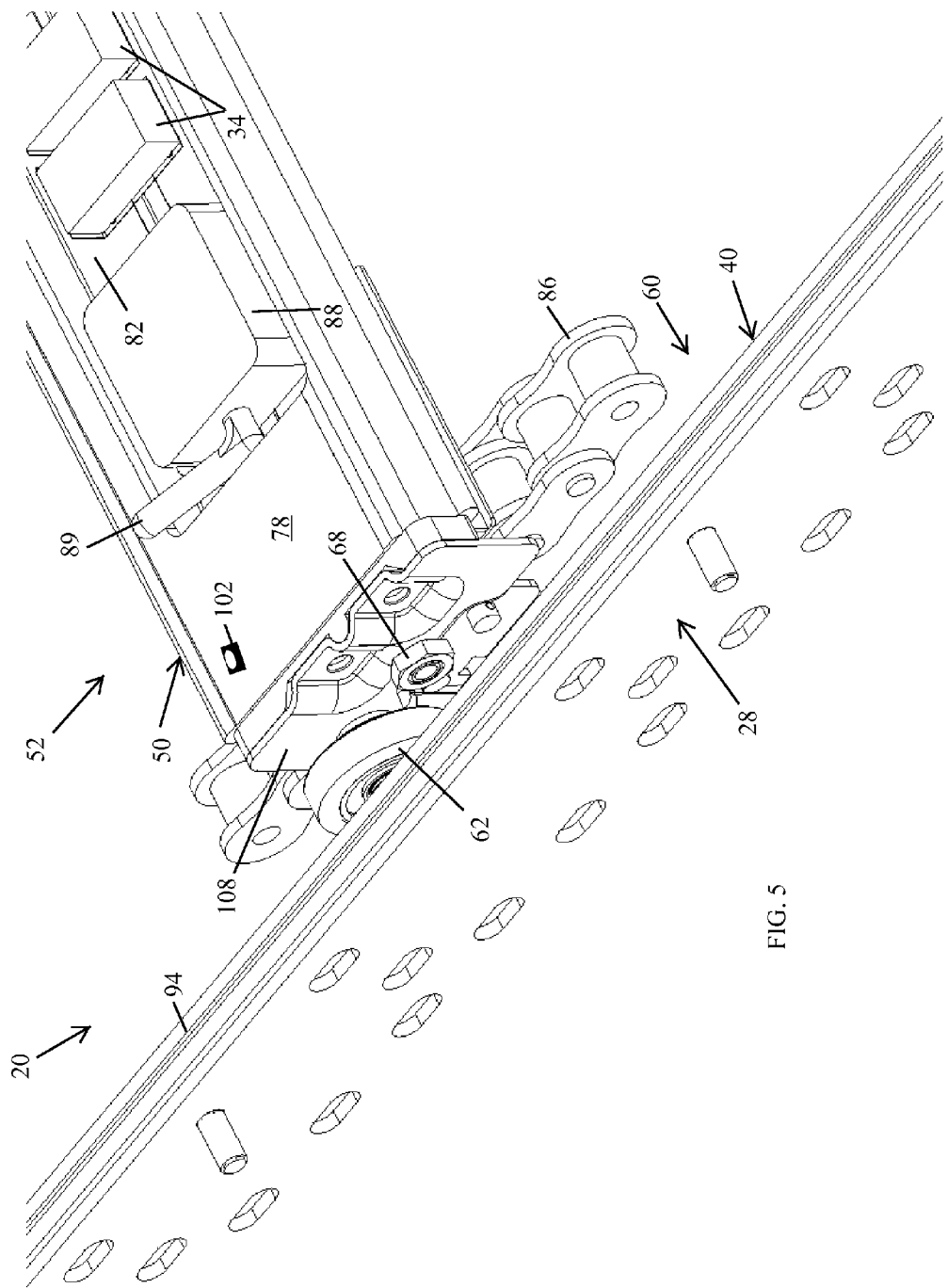
FIG. 5 is a partial perspective view of a material handling system frame and the slat of FIG. 2.

Diagnostic device 52 may further include a non-contact distance sensor 68 (FIG. 5). Distance sensor 68 senses distance between a side of slat 50 and the corresponding restraining surface 66 as a function of the forward movement of slat 50 in the direction of conveyance 26. Modified slat 50 includes a distance sensor 68 at each lateral side 76a and 76b of slat 50 that senses the distance to the corresponding restraining surface 66. The pair of distance sensors 68 are thus capable of measuring the distances between opposite restraining surfaces 66 as a function of the forward movement of slat 50 in direction 26. In some embodiments, the distance between each distance sensor 68 is known and fixed. By adding the measurements of each sensor 68 to this known and fixed distance, the total lateral spacing between tracks 60 can be determined along the entirety of endless loop 48. In other embodiments, the distance between sensors 68 need not be determined, in which case the relative distance between slat 50 and each of the two tracks 60 on either side is determined. In one embodiment, distance sensor 68 is an ultrasonic sensor, but other sensing technology may be used, such as a radar sensor, a hypersonic sensor, and the like.

Because the dimensions of modified slat 50 are the same as the dimensions of an unmodified slat 30, the force, distance, and acceleration measurements generated by sensors 72, 68, and 70, respectively, will correspond to the forces, distances, and accelerations that are experienced by the unmodified slats 30. That is, the measurements made by sensors 68, 70, and 72 will be accurate reflections of the forces experienced, and positions occupied, by unmodified slats 30. Indeed, in one embodiment, diagnostic device 52 can be mounted to an unmodified slat 30 and the measurements of sensors 68, 70, and 72 taken. Such measurements should match those that would be generated by mounting diagnostic device 52 inside a modified slat 50 if such measurements were taken on the same conveying system 20 under similar conditions. Stated alternatively, modified slat 50 is constructed such that the measurements made by diagnostic device 52 will generally be the same whether diagnostic device 52 is mounted inside a modified slat 50 or mounted outside an unmodified slat 30. In either situation, the measurements taken will be accurate reflections of the actual forces and movement experienced by each of the slats of the endless web 32.

Diagnostic device 52 may also include a wireless transmitter 88 having an antenna 89 that travels with modified slat 50 and which wirelessly communicates with a generally stationary wireless receiver 90 located remotely from transmitter 88 (FIGS. 5 and 17). This allows diagnostic device 52 to transmit diagnostic readings during diagnostic testing of the material handling system 20. Such diagnostic readings may encompass the raw data read from sensors 68, 70, and 72, or any subcombination thereof, or it may encompass such data in a more processed form. Receiver 90 may be in communication with a processing device, such as a computer 92, that processes the received data and allows the data to be displayed in an efficient manner for diagnostic purposes, such as a graphical display of the data.

The display of the data on computer 92, or another device having a display capability, allows a technician to receive diagnostic data while observing real-time operation of the material handling system in order to correlate the data with machine operation. This provides a telemetry system utilizing an instrumented slat. However, the diagnostic data may be provided to the technician in other forms. For example, a portable electronic memory device (not shown) may be used to receive the diagnostic data during the test while traveling with the diagnostic device 52. The memory device stores some or all of the readings of sensors 68, 70, and 72. After the test, the portable memory device can be removed from the material handling system and connected with a computer for downloading of the data.

As described above, each diagnostic device 52 includes a distance sensor 68, an acceleration sensor 70, a lateral force sensor 72, and a transmitter 88. Variations to this are possible. For example, diagnostic device 52 may include fewer than these three types of sensors. For example, accelerations sensors 70 may be omitted in some embodiments. In other embodiments, one or more of the other sensors 68 and 72 may be omitted. In still other embodiments, additional sensors for measuring other quantities may also be added to diagnostic device 52. Such additional sensors may be used to gather any additional diagnostic information about conveying system 20 that may be useful for evaluating the condition of system 20. In addition, it will be understood by those skilled in the art that term "diagnostic device" may refer to the entire modified slat 50, including the sensors and electronics; or it may refer to just the sensors and the electronics separate from slat 50; or it may refer to the electronics and sensors that may be added to an unmodified slat 30. Thus, the term "diagnostic device" is meant to include a broad array of different configurations and components.

Figure 17A:
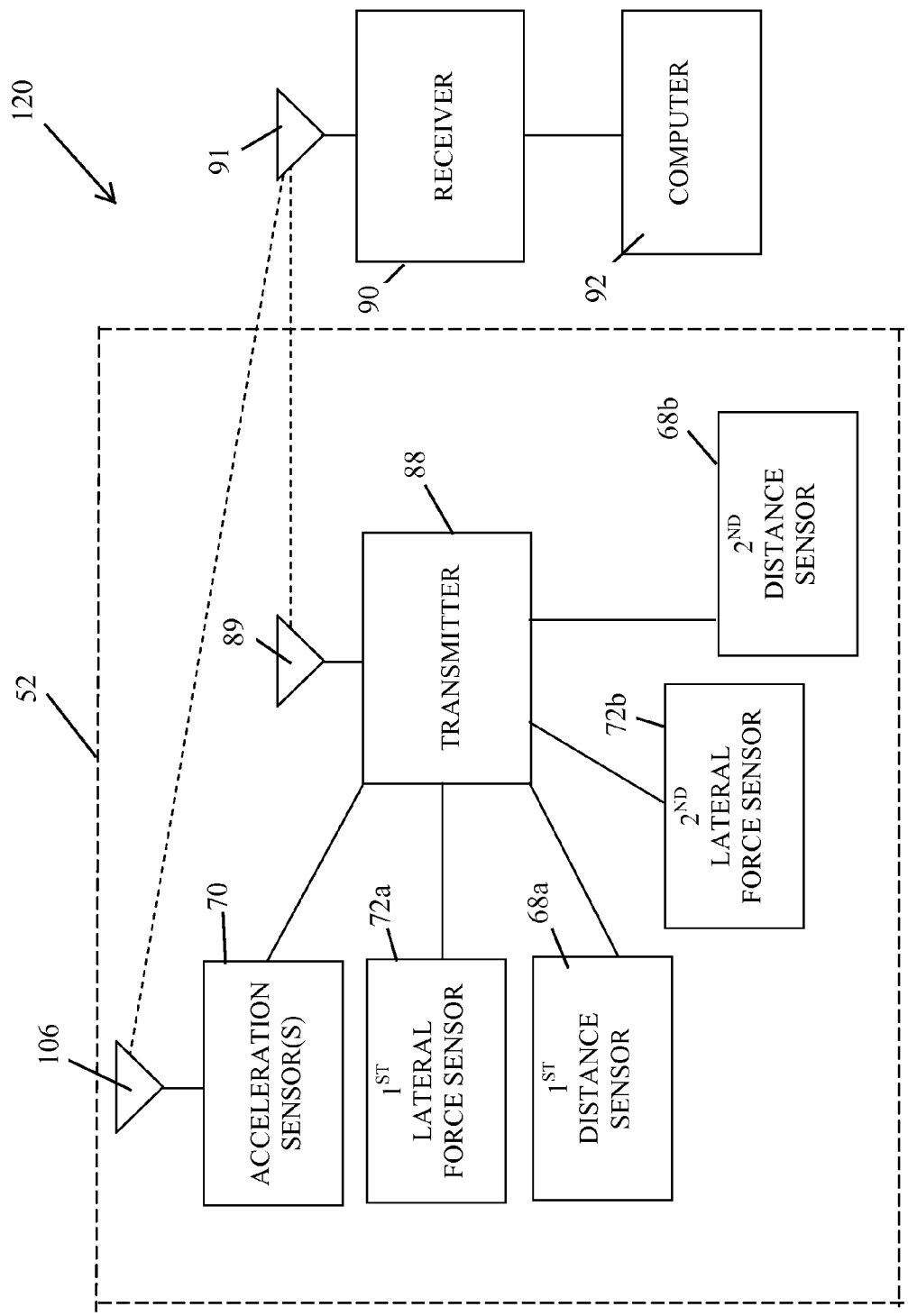
FIG. 17A is an electrical block diagram of a first embodiment of a diagnostic system.
Figure 17C:
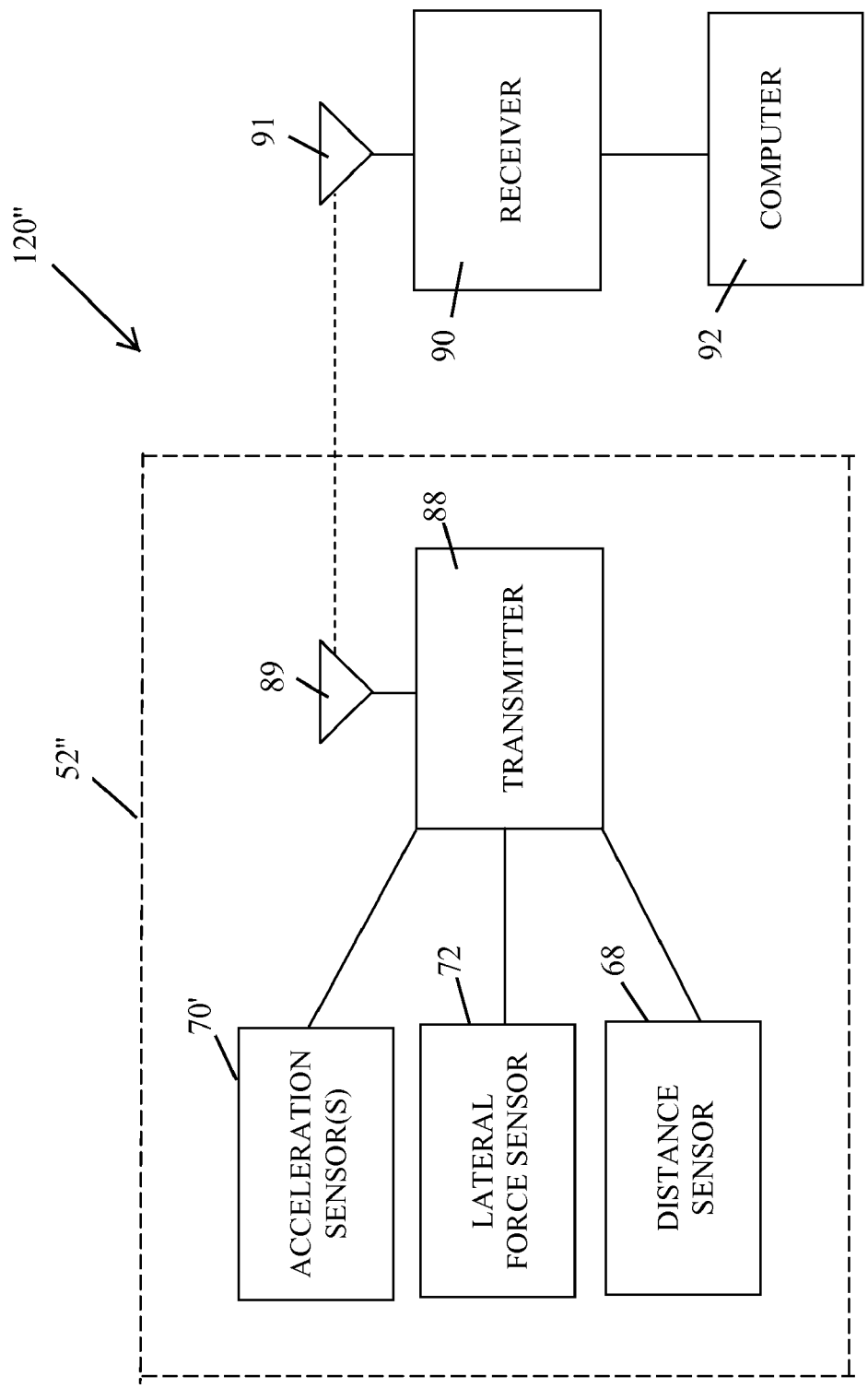
FIG. 17C is an electrical block diagram of a third embodiment of a diagnostic system.

FIGS. 17A-C illustrate several different configurations of the diagnostic device that may be incorporated into a diagnostic system 120. In the configuration shown in FIG. 72A, diagnostic device 52 includes a first distance sensor 68a, a second distance sensor 68b, an acceleration sensor 70, a first lateral force sensor 72a, and a second lateral force sensor 72b. This is the embodiment of diagnostic device 52 that is shown in FIGS. 2-4. In this embodiment, distance sensors 68a and 68b, as well as lateral force sensors 72a and 72b, are each in electrical communication with transmitter 88. The outputs of these four sensors are fed to transmitter 88, which wirelessly transmits them, either before or after additional processing, to receiver 90 via antennas 89 and 91. Acceleration sensor 70 includes its own antenna 106 and internal transmitter (not shown) and transmits its signals directly to antenna 91 of receiver 90. First lateral force sensor 72a detects the force exerted by first side 76a of slat 50 against restraining surface 66. Second lateral force sensor 72b detects the force exerted by second side 76b of slat 50 against restraining surface 66. First distance sensor 68a detects the distance of first side 76a of slat 50 from restraining surface 66, while second distance sensor 68b detects the distance of second side 76b of slat 50 from restraining surface 66. Acceleration sensor 70 detects acceleration in three mutually orthogonal directions, although it will be understood that it may detect acceleration in fewer directions.

An alternative diagnostic system 120' is shown in FIG. 17B. Diagnostic system 120' includes a modified diagnostic device 52'. Diagnostic device 52' differs from device 52 in that acceleration sensor 70' sends its output signals to transmitter 88 for transmission to receiver 90, unlike acceleration sensor 70, which includes its own antenna 106 and transmitter. The remaining components of diagnostic device 52' are the same as in diagnostic device 52.

Another alternative diagnostic system 120" is shown in FIG. 17C. Diagnostic system 120" includes a modified diagnostic device 52" which has only a single lateral force sensor 72 and a single distance sensor 68, as well as acceleration sensors 70'. Sensors 70', 72, and 68 operate in the same manners as discussed above.

Still other alternatives of diagnostic device 52 and diagnostic system 120 are possible. As was noted previously, diagnostic device 52 may be modified to include a lesser or greater number of sensors than that shown in any of the embodiments of FIGS. 17A-C. Diagnostic system 120 may also be modified to include communication between receiver 90 and another device either in addition to, or in lieu of, computer 92. As another modification, the data from diagnostic device 52 could alternatively be harvested from diagnostic device 52 via temporary storage in on-board memory that was later transferred to a computer, or other processing device, via a wired connection, or other suitable connection. In still other embodiments, diagnostic device 52 could include its own display for displaying the data gathered by device 52. Other variations are also possible.

FIG. 3 illustrates an alternative embodiment of diagnostic device 52 that has been labeled 152. Diagnostic device 152 differs from diagnostic device 52 in the physical location of the sensors 68, 70, and 72, as well as the position of wheels 62a and 62b. Diagnostic device 152 operates in the same manner as has been described herein with regard to diagnostic device 52, and may be further modified in the same manner discussed herein with respect to diagnostic device 52. Diagnostic device 152 may be useful in situations where the existing conveying system 20 utilizes unmodified slats 30 that includes wheels 62a and 62b in their upper left and lower right hand corners, when viewed from above in the manner shown in FIG. 3. That is, some positive displacement sorters utilize different types of slats 30, depending upon whether the conveying system 20 is adapted to push articles off to the right side of the conveying system 20 (as viewed looking from charge end 44 toward discharge end 46 in the direction of conveyance 26), or to the left side of the conveying system 20. A skilled technician wishing to utilize either diagnostic device 52 or 152 with the existing conveying system 20 would choose whichever slat 50 or 50' matched the existing system in terms of the position of wheels 62a and 62b. Stated alternatively, if the conveying system 20 utilized slats 30 with wheels 62 in the lower left and upper right hand corners, when viewed from above as in FIG. 2, then the technician would ideally choose to use diagnostic device 52. On the other hand, if the conveying system 20 utilized slats 30 with wheels 62 in the upper left and lower right corners, when viewed from above as in FIG. 3, then the technician would ideally choose to use diagnostic device 152. By making these choices, the diagnostic device 52 will match the existing slats 30. It will be understood, however, that it is not critical that the diagnostic device 52 or 152 perfectly matches the configuration, size, and/or weight of an existing slat 30 for the device 52 or 152 to provide valuable diagnostic data.

It will further be understood that in at least one embodiment, diagnostic device 52 can easily be changed into device 152, and vice versa. Such changes can be accomplished by replacing the carrier plates 108 (FIGS. 2-5) attached to each end of body 74 of slat 50 (or 50'), for another carrier plate 108 that is modified to support the associated wheel 62 at a different position. Diagnostic device 52 can therefore be marketed as a single diagnostic kit with modified carrier plates 108 that may be attached and detached depending upon the particular type of conveying system 20 to which it is applied.

In both diagnostic devices 52 and 152 (FIGS. 2 and 3), acceleration sensor 70 is shown physically located on a side of slat 50 (or 50') opposite sensors 68 and 72. This arrangement of sensors 68, 70, and 72 may be modified, as will be apparent to one skilled in the art. Whatever physical arrangement of sensors is used, it may be desirable, however, to space the sensors such that the weight of the sensors generally does not create any gross weight imbalance between one side of the slat versus the other. Batteries 34 may supply power to sensor 70 in addition to sensors 68 and 72, or sensor 70 may include its own set of batteries, such as, but not limited to, an internal rechargeable battery.

Figure 18:
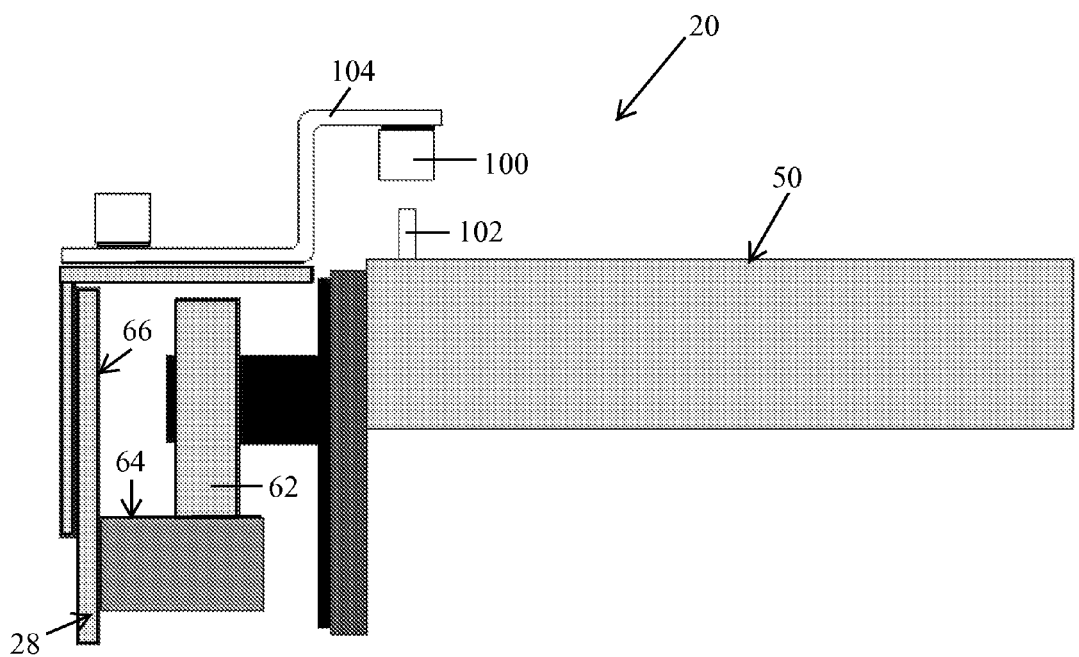
FIG. 18 is partial, elevational diagram of a bracket and reference object attached to material handling system.

As was mentioned above, the data gathered by diagnostic device 52 may be more useful to a technician or other interested individual when the data is correlated with the position of the diagnostic device 52 as its moves along endless loop 48. Any suitable way for establishing this correlation may be used. In one embodiment, a reference object 100 is affixed to conveying system 20 at a known location (FIG. 18). This reference object 100, which may be a magnet, is sensed by a reference object sensor 102 positioned on diagnostic device 52 (FIGS. 2-4 and 18). If object 100 is a magnet, then reference object sensor 102 may be a Reed switch, a Hall-effect sensor, or any other suitable type of sensor for detecting when object sensor 102 passes by object 100.

Figure 19:
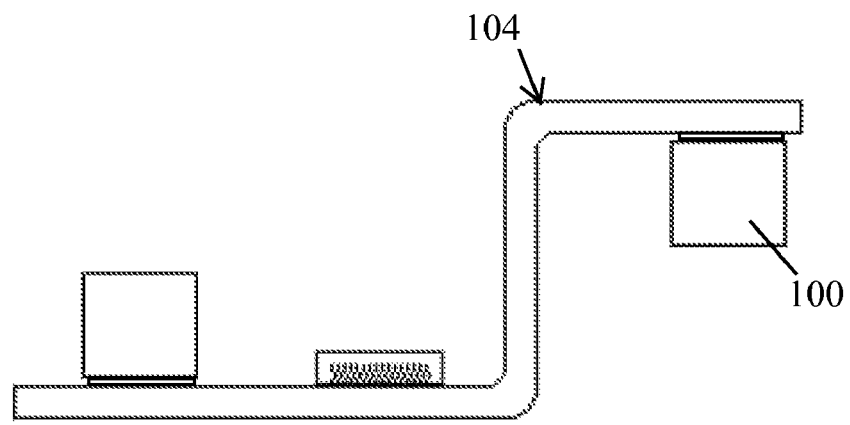
FIG. 19 is a side, elevational view of a first embodiment of the bracket of FIG. 18.
Figure 20:
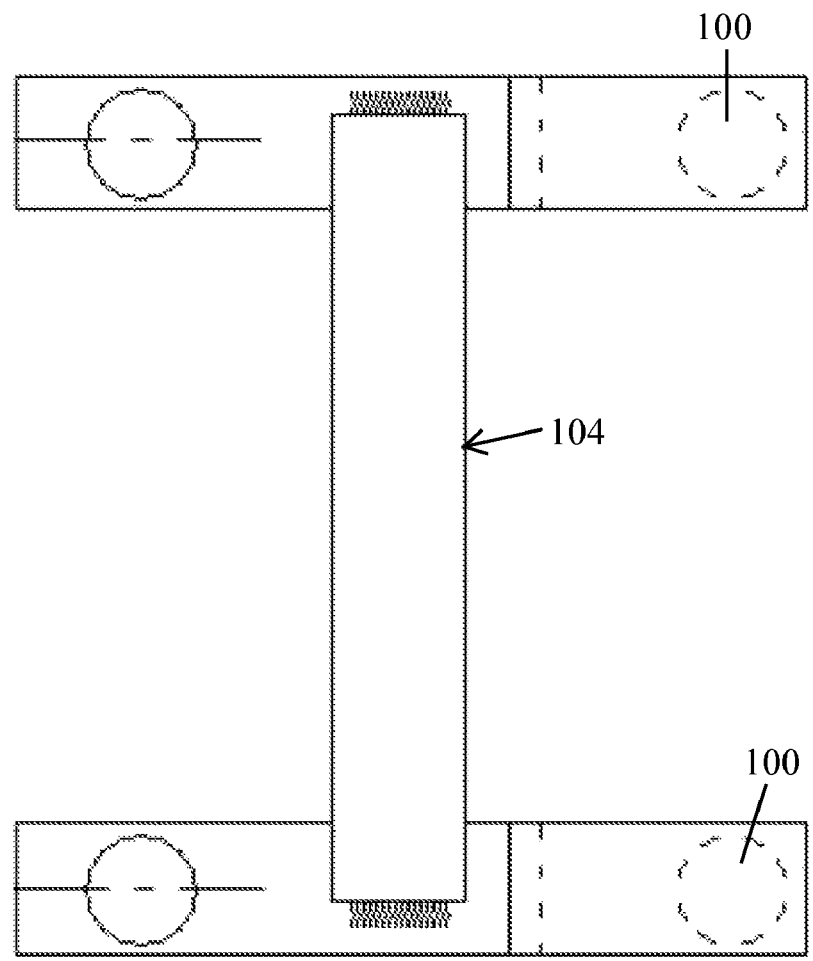
FIG. 20 is a plan view of the bracket of FIG. 19.
Figure 21:
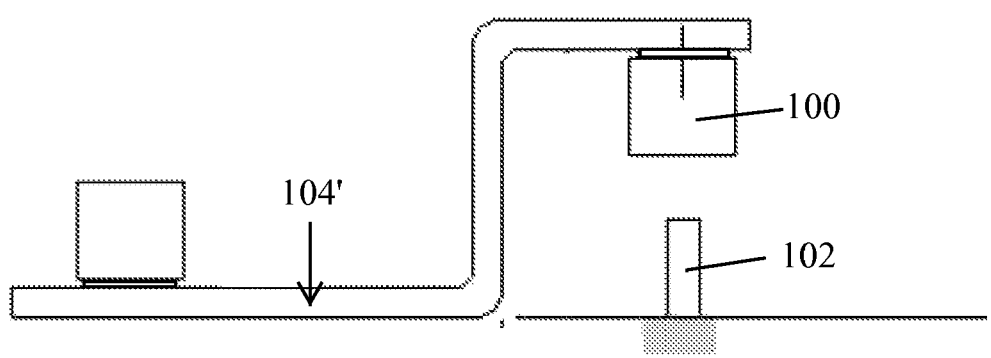
FIG. 21 is a side, elevational view of a second embodiment of the bracket of FIG. 18.
Figure 22:
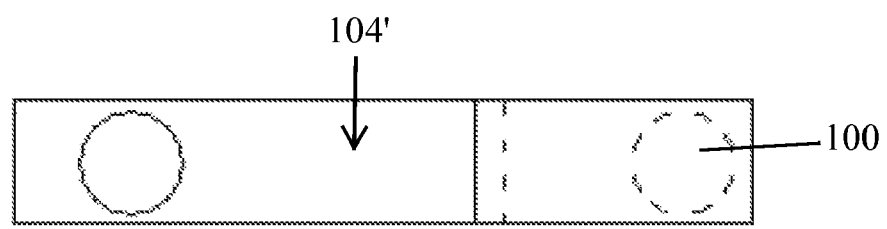
FIG. 22 is a plan view of the bracket of FIG. 21.

Reference object 100 may be attached to conveying system 20 by way of a bracket 104 that may be temporarily affixed to the frame 28 of conveying system 20. In the embodiment of FIGS. 19 and 20, bracket 104 is adapted to support a pair of reference objects 100 that are spaced apart from each other. In a different embodiment illustrated in FIGS. 21 and 22, bracket 104' is configured to support only a single reference object 100. Other types of brackets and configurations of reference objects 100 may be used.

In one embodiment both brackets 104 and 104' may be used on the same conveying system 20 during a diagnostic evaluation. When both brackets are used, they are spaced longitudinally apart along the length of conveying system 20 at known locations. Because one supports a single reference object 100 while the other supports a pair of objects 100, it is possible for diagnostic device 52, which is in electrical communication with reference sensor 102, to differentiate between the reference objects 100 it passes by.

In one embodiment, a method of evaluating a conveying system 20 is provided that includes replacing an unmodified slat 30 with a modified slat 50 containing diagnostic device 52. In addition, one or more reference objects 100 are temporarily affixed to conveying system 20 by way of brackets 104 or 104'. These reference objects are positioned at known locations along the length of conveying system 20. For example, one reference object may be positioned at the charge end 44 and the other may be positioned a known distance downstream, such as fifty feet. Other locations and arrangements of the reference objects 100 may also be used, and in at least one embodiment, it is sufficient to utilize only a single reference object.

After the slat 50 with diagnostic device 52 is installed and the reference object(s) are placed, the conveying system is activated such that slats 30 begin to move in the direction of conveyance 26. In order to allow sufficient time for the endless web 32 of slats 30 (and slat 50) to attain a steady speed, which may be the normal operating speed of conveying system 20, conveying system 20 may be allowed to run for one or more circuits around endless loop 48. After conveying system 20 has reached the desired speed, diagnostic device 52 begins recording and/or transmitting the readings received from sensors 68, 70, and 72. This recording and/or transmitting may begin at the moment diagnostic device 52 senses the first of the reference objects 100. It may alternatively begin at other moments. Conveying system 20 continues to run until, in one embodiment, diagnostic device 52 has made at least one complete circuit around endless loop 48. The data that is gathered by diagnostic device 52 may be gathered without any articles positioned on, or transported by, conveying system 22, thereby precluding any forces of the articles from affecting the measurements taken by device 52. In other embodiments, the diagnostic device 52 may be utilized while articles are being transported on conveying system 20 in order to assess the influence of the articles on the operation of the system 20.

Regardless of whether articles are present or not, the data gathered during diagnostic device 52's circuit around endless loop 48 may be stored in memory on board slat 50, or it may be transmitted to receiver 90, or a combination of both. The data is preferably arranged so that it is correlated to the longitudinal location along conveying system 20 at which the instantaneous measurements were made. Such correlation is made through the use of reference objects 100 and their known location, and may be based on an assumption that conveying system 20 has operated at a constant speed throughout the data gathering session. In other embodiments, a speed sensor may be added to diagnostic device 52 in order to measure its speed throughout its data-gathering session, or the outputs of one or more of the acceleration sensors 70 may be used to assist in correlating the gathered data to position.

In some embodiments, diagnostic device 52 may be applied to a newly installed conveying system 20 to confirm that it has been installed within the desired specifications. The data gathered from diagnostic device 52 may thereafter be stored in a record for future use. For example, if the installed conveying system later has performance issues that occur, such as weeks, months, or years later, the diagnostic device 52 can be re-installed and another session of data can be gathered. The freshly gathered data can then be compared to the data that was gathered during the installation of the conveying system. The initial data gathered during system installation thus acts as a sort of baseline set of data against which future sets of data may be compared. Such comparison can provide useful information on what characteristics of the conveying system have changed during the interim time period between the baseline data and the subsequent data. Further, each time data is gathered by diagnostic device 52 on a particular conveying system 20, it may be stored in a record that is correlated to that particular conveying system 20, thus enabling a history of the conditions of that conveying system 20 to be generated. Such historical information may be useful for fixing any problems that occur with the conveying system, as well as preventing future problems.

While the diagnostic device 52 has been described primarily for use with a positive displacement shoe and slat sorter, it may be applied to a wide variety of material handling systems. For example, it may be applied to a carousel sorter, such as a tilt-tray sorter or a cross-belt sorter. In a carousel sorter, the track may be made up of a single I-beam or may be made up of a pair of parallel generally horizontal endless tracks and the material support member is made up of an endless loop of interconnected carriages that are supported at opposite end portions by the endless tracks. Each of the carriages has a laterally discharging article support member, such as a laterally oriented belt or a tilt tray. In such an application, the track includes one or more generally vertical restraining surfaces provided to guide the carriages. Such surface may be being adjacent to a wheel support or may be a vertical surface of the I-beam.

As another example, diagnostic device 52 may be applied to a material handling system in the form of an automated storage and retrieval system. An automated storage and retrieval system includes a linear rail and a material support member in the form of a lift assembly that is supported by the liner track. The lift assembly is capable of placing loads to and retrieving loads from a matrix of storage cells. In such a material handling system, the generally vertical restraining surface is a surface defined by the rail that laterally restrains the lift assembly. Other applications will be apparent to the skilled artisan.

Figure 13:
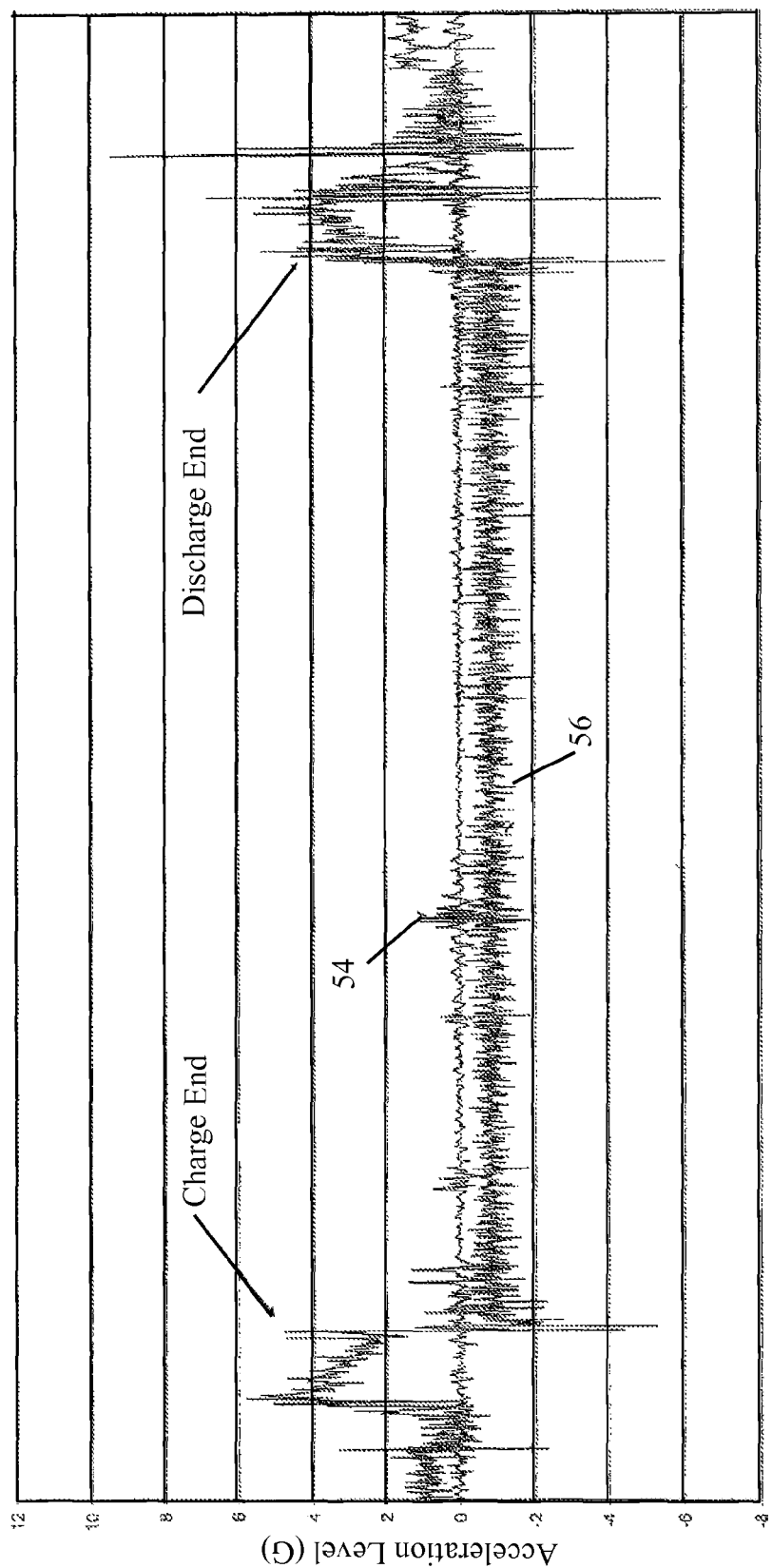
FIG. 13 is a diagram illustrating acceleration signals produced by the diagnostic device.

The data gathered by diagnostic device 52, as well as its operation, can be better understood by reference to FIGS. 13 through 16. Acceleration sensor 70 may be capable of producing acceleration signals in potentially three orthogonal directions. In FIG. 13, two such signals are illustrated. A first signal 54 illustrates acceleration in a horizontal axis that is lateral of the movement of the slats 30 along the track(s) 60. A second signal 56 illustrates acceleration in a vertical axis. As can be seen by reference to signal 56, the vertical acceleration sensor experiences high acceleration values as the diagnostic device 52 moves from the lower run of the upper run of material handling system 20 (i.e. at the charge end 44), which is where articles are loaded onto the system 20. High vertical acceleration values are also experienced as the diagnostic devices moves from the upper run to the lower run at the discharge end 46. Horizontal acceleration signal 54 is of particular use in mapping the shape of the material handling system 20. If signal 54 is mathematically processed by double integration, the resulting values track lateral positions of slat 50 as it moves along the track 60. This is capable of providing useful information about the straightness of the track(s). If the tracks are not straight, such as because of installation errors or because of movement of the floor upon which the sorter frame is mounted, the slats or material support members 30 may experience excessive drag. The lateral horizontal signal produced by the acceleration sensor is capable of mapping the straightness of the tracks.

Figure 14:
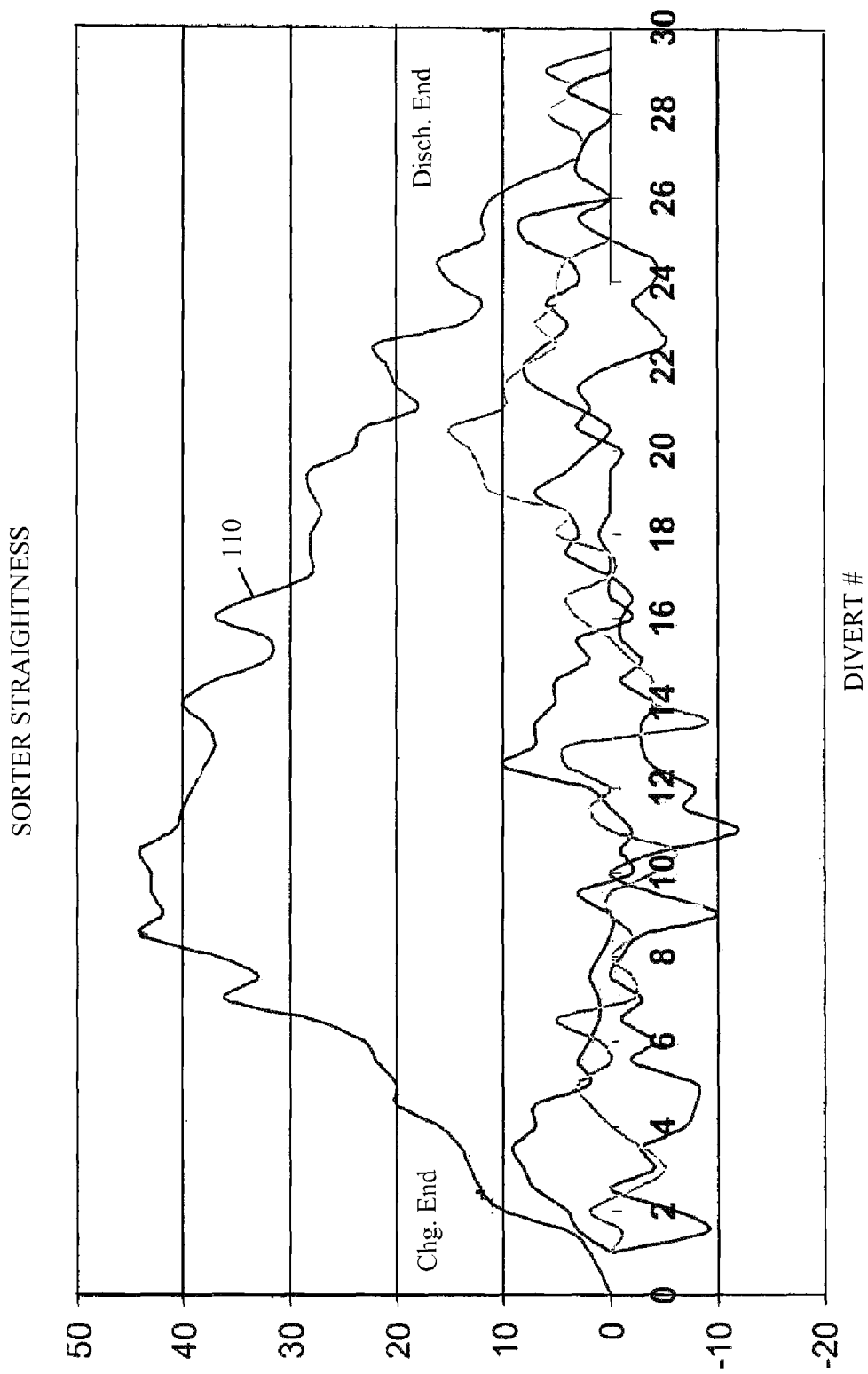
FIG. 14 is a diagram illustrating straightness measurements of four material handling systems that are of the type produced from the acceleration signals illustrated in FIG. 13.

An example of the type of information that diagnostic device 52 is capable of producing is illustrated in FIG. 14. This diagram shows data gathered from multiple difference positive displacement sorters, labeled as graphs 110, 112, 114, and 116. It can be seen that the positive displacement sorter that yielded the data of graph 110 experienced a more severe lack of straightness than the other sorters.

Figure 15:
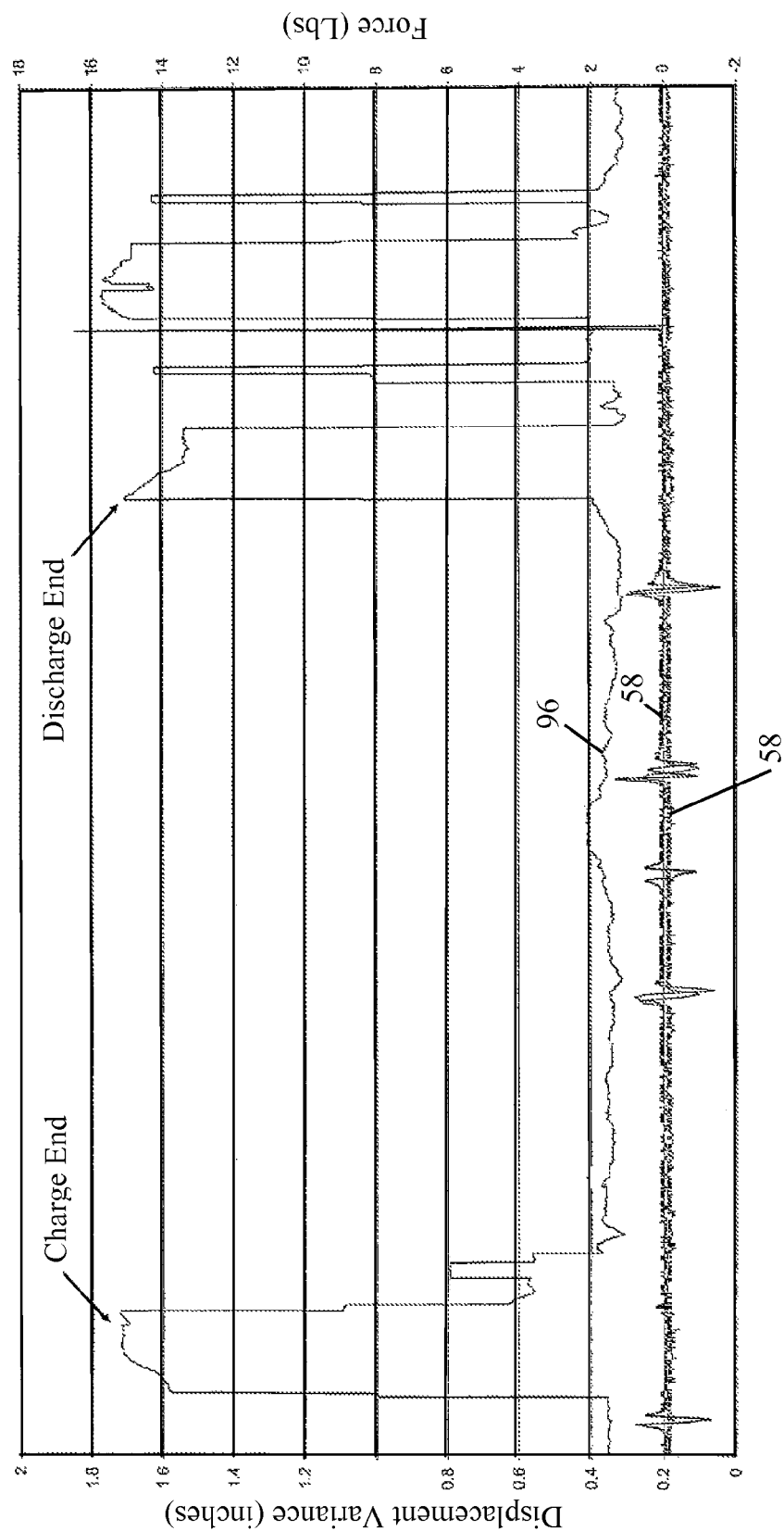
FIG. 15 is a diagram illustrating separation signals and force signals produced by the diagnostic device.

FIG. 15 illustrates signals produced by lateral force sensor 72 and non-contact distance sensor 68. A pair of lateral force sensor signals 58 show that on at least four occasions, the material support member makes contact with one or more of the vertical restraining surfaces 66, thereby potentially generating drag on the slats 30. If contact is made at only one side, which is seen where only one signal 58 experiences deviation, then only one vertical restraining surface is contacted. If both signals 58 experience deviation, then the material support member has bounced off of both surfaces and may be pinched between the surfaces. This information may useful in determining if there is excessive drag on slat 30 created by excessive contact with one of the vertical restraining surfaces 66.

Figure 16:
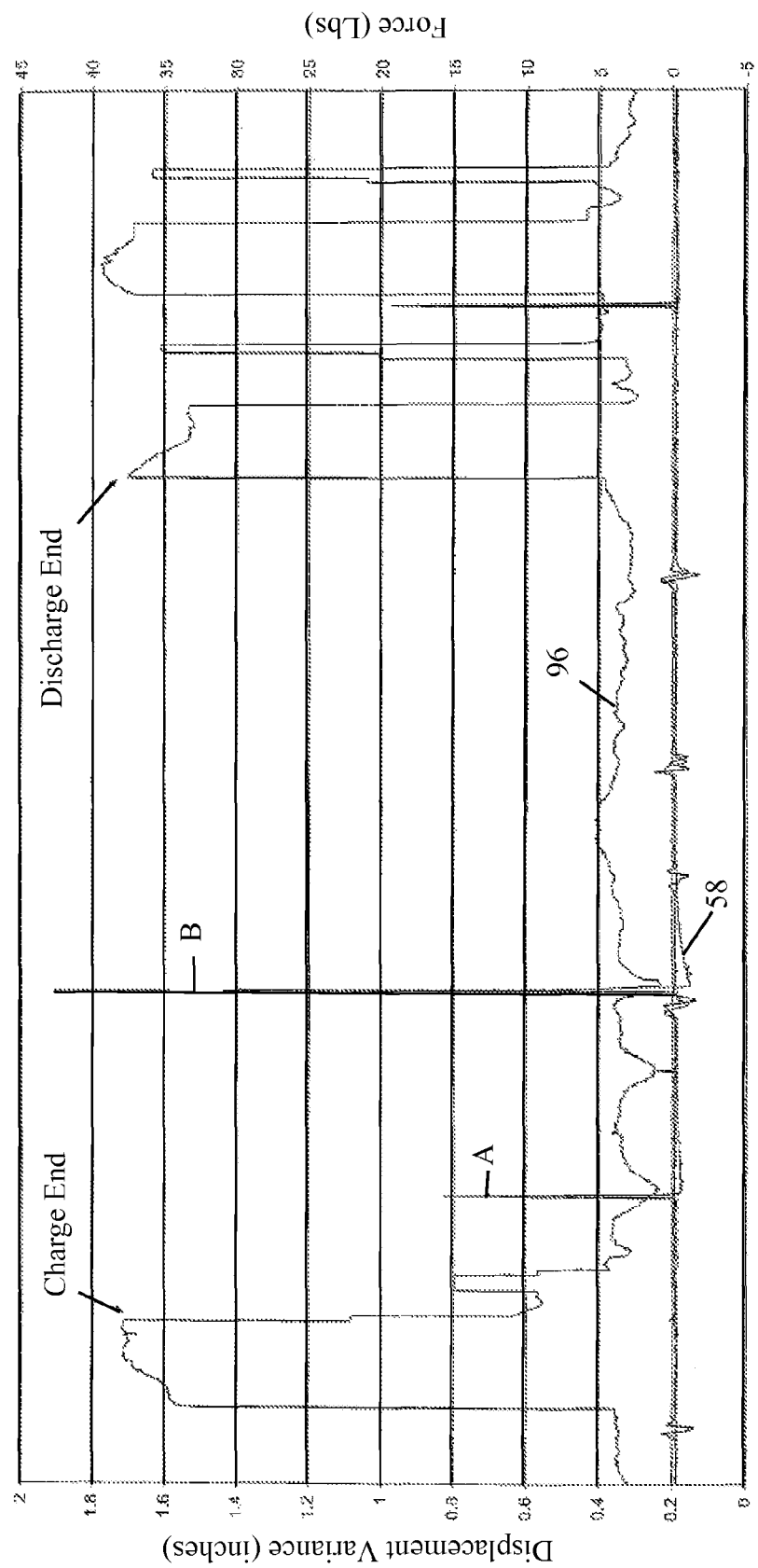
FIG. 16 is the same view as FIG. 15 taken on a material handling system that has been modified to illustrate the affect on the distance signals and the force signals.

An example of large contact with surfaces 66 can be seen with reference to FIG. 16. It can be seen that force signal 58 can experience large spikes, such as at A and B, if there is significant contact between the material support member and one of the vertical restraining surfaces. By knowing the height of the spike, the force of contact may be determined. By knowing the coefficient of friction of the material defining the vertical restraining surface, the amount of drag can be estimated. This allows the technician to determine whether a particular location of the material handling system is out of alignment.

Separation signal 96 produced from the outputs of both non-contact distance sensors 68 shows the separation between the vertical restraining surfaces 66 on opposite sides of the slat 30. This allows the technician to determine if there are any places where the separation is too narrow and may be creating contact between the slat 30 and one or more of the vertical restraining surfaces 66. In the examples illustrated, the large values of signal 96 at the charge and discharge ends of the sorter are an anomaly produced by the absence of UHMW blocks at those places. However, by reference to FIG. 16. 13, it can be seen that, at areas where spikes A and B are produced in force signal 58, the value of separation signal 96 also decreases thereby providing further evidence that there is a misalignment of the frame at that location. Thus, it can be seen that additional useful information can be obtained from a combination of the separation signal 96 and force signal 58.

The diagnostic device 52 disclosed herein has may uses. As noted, it may be used as an installation tool. In such an application, the device is applied to the material handling system after installation in order to verify that the system meets installation specifications as well as to diagnose the nature of any deviation from such specifications. It may also be used as an auditing tool to be applied to the material handling system from time to time to verify whether the material handling system is still operating within installation specifications. Also, diagnostic device 52 may be used as a troubleshooting tool in order to assist the technician in diagnosing operational problems of the material handling system. Such operational problems may show up as excessive ampere draw by the drive motor for the material support member. Such excessive ampere draw is a direct indication of drag developing in movement of the material support member along the track(s). While it may be apparent that there is excessive drag, it may not be apparent why it is occurring. This is because the length of such material support members introduces many possible areas that may be out of specification. It would take a team of technicians a relatively long time to manually gauge the entire material handling system to determine where it is out of specification. Because material handling systems are often relied upon to be operational with little down time, the time required to manually locate out of specification areas could severely impact economical operation of the material handling system.

Changes and modifications in the specifically described embodiments can be carried out without departing from the principles of the invention. For example, although the diagnostic device is illustrated as a tool that can be applied to the material handling system to conduct diagnostic tests and then removed after completion of the test, the diagnostic device can be built into the material handling system for ongoing monitoring of its operation. The invention is intended to be limited only by the scope of the appended claims, as interpreted according to the principles of patent law including the doctrine of equivalents.

What is claimed is:

1. A diagnostic device for evaluating a conveying system adapted to transport articles over an endless web of slats in a direction of conveyance, said endless web of slats adapted to travel in an endless loop adjacent a plurality of stationary surfaces, said diagnostic device comprising:
   a body having first and second ends;
   a first force sensor positioned adjacent said first end of said body and adapted to detect a first amount of force exerted by a first portion of said diagnostic device against a first one of said stationary surfaces, said first force oriented in a direction substantially parallel to a longitudinal axis of said body extending from said first end to said second end;
   a second force sensor positioned adjacent said second end of said body and adapted to detect a second amount of force exerted by a second portion of said diagnostic device against a second one of said stationary surfaces, said second force oriented in a direction substantially parallel to said longitudinal axis;
   a reference object sensor attached to said body and adapted to detect a reference object positioned at a known location along said endless loop; and
   a transmitter attached to said body and adapted to wirelessly transmit data to a remote receiver, said data being related to said first and second amounts of force and a position of said reference object.

2. The device of claim 1 further including at least one acceleration sensor adapted to detect acceleration of said body in a plurality of orthogonal directions wherein said transmitter is adapted to wirelessly transmit data relating to said acceleration of said body to a remote receiver.

3. The device of claim 1 further including:
   a first wheel attached to said first end of said body, said first wheel adapted to rotate on a first axle oriented generally parallel to said longitudinal axis of said body;
   a second wheel attached to said second end of said body, said second wheel adapted to rotate on a second axle oriented generally parallel to said longitudinal axis of said body; and
   wherein said first force sensor is attached to said first axle and said second force sensor is attached to said second axle.

4. A method of evaluating a conveying system adapted to transport articles in a direction of conveyance, said conveying system including a plurality of material support members that move in an endless loop and travel between spaced apart first and second stationary surfaces, the upper ones of said material support members defining an article-conveying surface, said method comprising:
   removing a selected one of said material support members from said conveying system and installing a diagnostic device on said conveying system in the position of said selected one of said material support members, said diagnostic device having a body of the same general size and shape as said selected one of said material support members and including at least one sensor at said body, wherein said at least one sensor comprises a first force sensor positioned at a first end portion of said body adjacent said first stationary surface and a second force sensor positioned at a second end portion of said body adjacent said second stationary surface and said method further including measuring with said first force sensor an amount of a first force exerted by said first end portion against said first stationary surface, said first force having at least a component oriented in a direction substantially perpendicular to said direction of conveyance and measuring with said second force sensor an amount of a second force exerted by said second end portion against said second stationary surface, said second force having at least a component oriented in a direction substantially perpendicular to said direction of conveyance;
   activating said conveying system with said diagnostic device installed, wherein said diagnostic device moves along the endless loop and collects data with said at least one sensor; and
   removing said diagnostic device after said activating and reinstalling said selected one of said material support members in the position of said diagnostic device.

5. A method of evaluating a conveying system adapted to transport articles in a direction of conveyance, said conveying system including a plurality of material support members that move in an endless loop and travel between spaced apart first and second stationary surfaces, the upper ones of said material support members defining an article-conveying surface, said method comprising:

removing a selected one of said material support members from said conveying system and installing a diagnostic device on said conveying system in the position of said selected one of said material support members, said diagnostic device having a body of the same general size and shape as said selected one of said material support members and including at least one sensor at said body, wherein said at least one sensor comprises a first distance sensor directed at said first stationary surface and a second distance sensor directed at said second stationary surface and said method further including measuring with said first distance sensor a first distance from said first stationary surface and measuring with said second distance sensor a second distance from said second stationary surface and calculating separation distance between said first and second stationary surfaces from the data collected with said first and second distance sensors;

activating said conveying system with said diagnostic device installed, wherein said diagnostic device moves along the endless loop and collects data with said at least one sensor; and removing said diagnostic device after said activating and reinstalling said selected one of said material support members in the position of said diagnostic device.

6. A diagnostic device for evaluating a sorter having an endless loop made up of a plurality of parallel slats interconnected at opposite ends with chains and wheels at said opposite ends of said slats, an upper surface of said slats defining a conveying surface that is adapted to transport articles being sorted, said endless web of slats adapted to travel in an endless loop adjacent spaced apart first and second stationary surfaces, said diagnostic device comprising:

a body having first and second ends, said body being of the same general size and shape as one of said slats and having at least a first wheel at said first end of said body and a second wheel at said second end of said body;

a first sensor positioned adjacent said first end of said body and adapted to detect said first stationary surface in a direction substantially parallel to a longitudinal axis of said body extending from said first end to said second end, said first sensor comprising at least one chosen from i) a first force sensor that is adapted to sense a first force exerted by a first portion of said diagnostic device against said first stationary surface and ii) a first distance sensor that is adapted to sense a first distance to said first stationary surface;

a second sensor positioned adjacent said second end of said body and adapted to detect said second stationary surface in a direction substantially parallel to said longitudinal axis, said second sensor comprising at least one chosen from i) a second force sensor that is adapted to sense a second force exerted by said second portion of said diagnostic device against said second stationary surface and ii) a second distance sensor that is adapted to sense a second distance to said second stationary surface; and a transmitter attached to said body and adapted to wirelessly transmit data from said first and second sensors to a remote receiver.

7. The device of claim 6 wherein said first wheel is adapted to rotate on a first axle oriented generally parallel to said longitudinal axis of said body, wherein said second wheel is adapted to rotate on a second axle oriented generally parallel to said longitudinal axis of said body, wherein said first sensor is supported by said first axle and said second sensor is supported by said second axle.

8. The device of claim 6 further including at least one acceleration sensor adapted to detect acceleration of said body in at least one direction, wherein said transmitter is adapted to wirelessly transmit data relating to said acceleration of said body to a remote receiver.

9. The device of claim 8 wherein said at least one acceleration sensor is adapted to detect acceleration of said body in a plurality of orthogonal directions.

10. The device of claim 6 wherein said first sensor comprises said first force sensor and said first distance sensor and wherein said second sensor comprises said second force sensor and said second distance sensor.

11. The device of claim 6 including a reference object sensor attached to said body and adapted to detect a reference object positioned at a known location along said endless loop and wherein said transmitter is adapted to wirelessly transmit additional data to said remote receiver, said additional data relates to a position of said reference sensor.

\* \* \* \* \*